(12) United States Patent
Yasuhara et al.

(10) Patent No.: US 10,298,800 B2
(45) Date of Patent: May 21, 2019

(54) INFORMATION PROCESSING APPARATUS AND CONTROL METHOD THEREOF

(71) Applicant: CANON KABUSHIKI KAISHA, Tokyo (JP)

(72) Inventors: Hiroshi Yasuhara, Yokohama (JP); Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/674,593

(22) Filed: Aug. 11, 2017

(65) Prior Publication Data

US 2018/0063352 A1 Mar. 1, 2018

(30) Foreign Application Priority Data

Aug. 24, 2016 (JP) .................. 2016-164066

(51) Int. Cl.
*G06F 3/12* (2006.01)
*H04N 1/00* (2006.01)

(52) U.S. Cl.
CPC ..... *H04N 1/00973* (2013.01); *H04N 1/00042* (2013.01); *H04N 1/00087* (2013.01); *H04N 1/00344* (2013.01); *H04N 1/00413* (2013.01); *H04N 1/00464* (2013.01); *H04N 1/00832* (2013.01); *H04N 1/00938* (2013.01); *H04N 2201/0039* (2013.01); *H04N 2201/0094* (2013.01)

(58) Field of Classification Search
CPC .......... H04N 1/00973; H04N 1/00042; H04N 1/00087; H04N 1/00464; H04N 1/00938; H04N 1/00344; H04N 1/00413; H04N 1/00832
USPC ....................................... 358/1.15
See application file for complete search history.

(56) References Cited

U.S. PATENT DOCUMENTS

| | | | |
|---|---|---|---|
| 8,120,793 B2 * | 2/2012 | Lovat | H04N 1/00204 358/1.14 |
| 2008/0043282 A1 * | 2/2008 | Tsuboi | H04N 1/00204 358/1.15 |
| 2011/0242568 A1 * | 10/2011 | Soga | G06F 3/1204 358/1.13 |
| 2013/0061149 A1 | 3/2013 | Ikeda et al. | |
| 2015/0188748 A1 | 7/2015 | Watariuchi | |
| 2015/0256716 A1 | 9/2015 | Yasuhara | |
| 2016/0028923 A1 | 1/2016 | Yasuhara | |
| 2017/0201651 A1 | 7/2017 | Sugiyama et al. | |

FOREIGN PATENT DOCUMENTS

JP  2013-054435 A  3/2013

\* cited by examiner

*Primary Examiner* — Neil R McLean
(74) *Attorney, Agent, or Firm* — Venable LLP

(57) ABSTRACT

A local application is prepared for each access destination for accessing the URL of a Web application. Upon calling the local application, a setting and URL associated with it are set and displayed in a Web browser. The local application monitors the state of the Web browser and initializes the state of the Web browser when they are hidden.

14 Claims, 22 Drawing Sheets

FIG. 5

| | MFP APPLICATION ID | LICENSE ACCESS NUMBER | VALID PERIOD | DEVICE ID | LICENSE ID |
|---|---|---|---|---|---|
| 516 | APP711 | XXX-XXX-101 | PERMANENT | - | - |
| 517 | APP711 | XXX-XXX-102 | PERMANENT | DEV001 | LIC001 |
| 518 | APP712 | XXX-XXX-201 | 60 DAYS | DEV002 | LIC002 |
| | ... | ... | | ... | |

Columns: 511, 512, 513, 514, 515

FIG. 6

```
LICENSE ID : LIC002
MFP APPLICATION ID : APP712
DEVICE ID : DEV002
VALID PERIOD : 60
```

FIG. 9

- 901 — MFP APPLICATION ID : APP712
- 902 — APPLICATION NAME : WebApp02
- 903 — TOP PAGE URL : http://www.canan.com/myportal?app=webapp01
- 904 — CONTEXT ROOT URL : http://www.canan.com/webapp01
- 905 — SSB SETTING : cookie=on, address_bar=off, cache=off, warn_not_exist_rootcert=on
- 906 — DEVICE INFORMATION LIST : user_id, device_id, device_model, encrypt_pdf, print_service_ver
  ...

1701 — MFP APPLICATION ID : APP713
1702 — APPLICATION NAME : send to my system
...

| | MFP APPLICATION ID | VALID PERIOD | LICENSE ID | LICENSE ID HISTORY |
|---|---|---|---|---|
| 1811 | APP711 | PERMANENT | LIC010 | - |
| 1812 | APP712 | 2016/12/10 | LIC002 | LIC003 |
| 1813 | APP713 | PERMANENT | LIC011 | - |
| | ... | | ... | ... |

| | APPLICATION TYPE (2101) | DISPLAY IDENTIFIER (2102) |
|---|---|---|
| 2111 | Web BROWSER | AAA111 |
| 2112 | MENU APPLICATION | AAA112 |
| 2113 | SYSTEM CONTROL APPLICATION | AAA113 |
| 2114 | COPY | AAA114 |
| 2115 | PRINT | AAA115 |
| 2116 | BOX | AAA116 |
| 2117 | LOCAL MFP APPLICATION A | AAA117 |

F I G. 27

| DEFINITION | SSB SETTING | RANGE |
|---|---|---|
| display_mixed_https | DISPLAY MIXED PAGE OF HTTPS/HTTP | 0 : OFF, 1 : ON |
| use_endpoint | RESTRICTION ON DEVICE INFORMATION NOTIFICATION | 0 : OFF, 1 : ON |
| ssl_warn_not_exist_rootcert | SERVER WARNING IN CASE OF NO ROOT CERTIFICATION | 0 : OFF, 1 : ON |
| ssl_warn_mismatch_cn | SERVER WARNING IN CASE OF CN MISMATCH | 0 : OFF, 1 : ON |
| ssl_warn_secure_in | WARNING DISPLAY WHEN ENTERING PROTECTED PAGE | 0 : OFF, 1 : ON |
| ssl_warn_secure_out | WARNING DISPLAY WHEN EXISTING PROTECTED PAGE | 0 : OFF, 1 : ON |
| set_cache_mode | USE OF CACHE | 0 : OFF, 1 : ON |
| set_cookie_mode | PROCESSING METHOD OF Cookie | 0 : USE, 1 : DISUSE |
| rest_url_entry | RESTRICTION ON URL INPUT | 0 : OFF, 1 : ON |
| rest_edit_favorites | RESTRICTION ON ADDITION/EDITING OF FAVORITES | 0 : OFF, 1 : ON |
| rest_printing | RESTRICTION ON PRINTING | 0 : OFF, 1 : ON |
| file_upload | RESTRICTION ON FILE UPLOAD | 0 : OFF, 1 : ON |
| rest_title | DISPLAY RESTRICTION ON TITLE | 0 : OFF, 1 : ON |
| rest_toolbar | DISPLAY RESTRICTION ON BUTTON PORTION OF TOOLBAR | 0 : OFF, 1 : ON |
| rest_addressbar | DISPLAY RESTRICTION ON ADDRESS PORTION OF TOOLBAR | 0 : OFF, 1 : ON |
| user_agent | SETTING OF USER AGENT | "CHARACTER STRING" |
| start_scanner | START OF SCANNER | 0 : OFF, 1 : ON |
| start_printer | START OF PRINTER | 0 : OFF, 1 : ON |

INFORMATION PROCESSING APPARATUS AND CONTROL METHOD THEREOF

BACKGROUND OF THE INVENTION

Field of the Invention

The present invention relates to an information processing apparatus and a control method thereof.

Description of the Related Art

It is known that an information processing apparatus such as a PC is connected to a Web server on a network, and an operation screen provided by a Web application on the Web server is displayed on a Web browser of the information processing apparatus. In such a system, first, the Web browser of the information processing apparatus requests the operation screen from the Web application on the Web server. Then, in response to the request from the information processing apparatus, the Web application responds, to the information processing apparatus, with HTML data for displaying the operation screen on the Web browser. The Web browser of the information processing apparatus analyzes the received HTML data and displays an operation screen based on the description of the HTML data. Furthermore, if a user inputs an instruction via the operation screen displayed on the Web browser, the Web browser notifies the Web server of the input instruction. Then, the Web application on the Web server that has received this notification performs a process according to the input instruction. In order to use a setting or the like specialized in use of a certain Web application, a browser called a site-specific browser (SSB) that operates only with a single web application is also developed.

In recent years, some Multi Function Peripherals (MFPs) each including a scanner and a printer have the above-described Web browsers. It is known that there exist some Web browsers on an MFP each having a function of registering a Web site registered in a bookmark in the top menu of the MFP as a shortcut button (Japanese Patent Laid-Open No. 2013-54435). This allows the user to access a Web application of interest not from a menu on the Web browser but from the top menu directly in the same way as accessing device applications installed in the MFP.

The device applications executed in the MFP can provide the user with an optimum user interface for each application by performing different types of settings and state management. On the other hand, since a common component, a browser, is used when a plurality of Web applications are used in the MFP, it is impossible to implement different settings and state management in accordance with the respective Web applications, and it is difficult to provide the optimum user interface for the Web application as for the device applications.

SUMMARY OF THE INVENTION

The present invention provides a user interface suitable for each Web application also in a case in which the Web applications are used via a Web browser commonly used.

The present invention has the following configurations.

According to an aspect of the present invention, the present invention provides an information processing apparatus comprising: a display unit; a web browser configured to display, on the display unit, a screen obtained from an access destination; an access unit associated with each specific access destination, and configured to call the web browser and access the specific access destination; and a saving unit configured to save a setting of the web browser according to the specific access destination, wherein the access unit executes the web browser with the setting saved in the saving unit in accordance with the associated specific access destination.

According to another aspect of the present invention, the present invention provides an image forming apparatus comprising: a Web browser; and an application configured to use a Web application, wherein the application includes a calling unit configured to call the Web browser so as to set to access an URL associated with the application and display in a display setting associated with the application, and an instruction unit configured to instruct to eliminate a history of the Web browser when a screen of the Web application is hidden.

According to the present invention, it becomes possible to provide the user interface suitable for each Web application also in a case in which the Web applications are used via the Web browser commonly used.

Further features of the present invention will become apparent from the following description of exemplary embodiments with reference to the attached drawings.

BRIEF DESCRIPTION OF THE DRAWINGS

FIG. 5 is a table showing an example of a license management table according to the embodiment;

FIG. 6 is a view showing an example of a license file issued by the license management server according to the embodiment;

FIG. 9 is a view showing an example of a manifest file of the Web connection MFP application according to the embodiment;

FIG. 27 is a table showing an example of setting items in an SSB setting.

DESCRIPTION OF THE EMBODIMENTS

An embodiment of the present invention will be described below in detail with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention. In this embodiment, applications will be defined as follows. An application program of a type provided from a Web server connected to a network will be referred to as a Web application. The operation screen of the Web application is displayed using a Web browser of a Multi Function Peripheral (MFP). On the other hand, an application of a type installed in the Multi Function Peripheral will be referred to as an MFP application or a device application. The installed MFP application is stored as data in the Multi Function Peripheral. An application of a type incorporated in the Multi Function Peripheral in advance will be referred to as a standard application. The standard application is stored as data in the Multi Function Peripheral.

Overall Arrangement of Information Processing System

Figure 1:
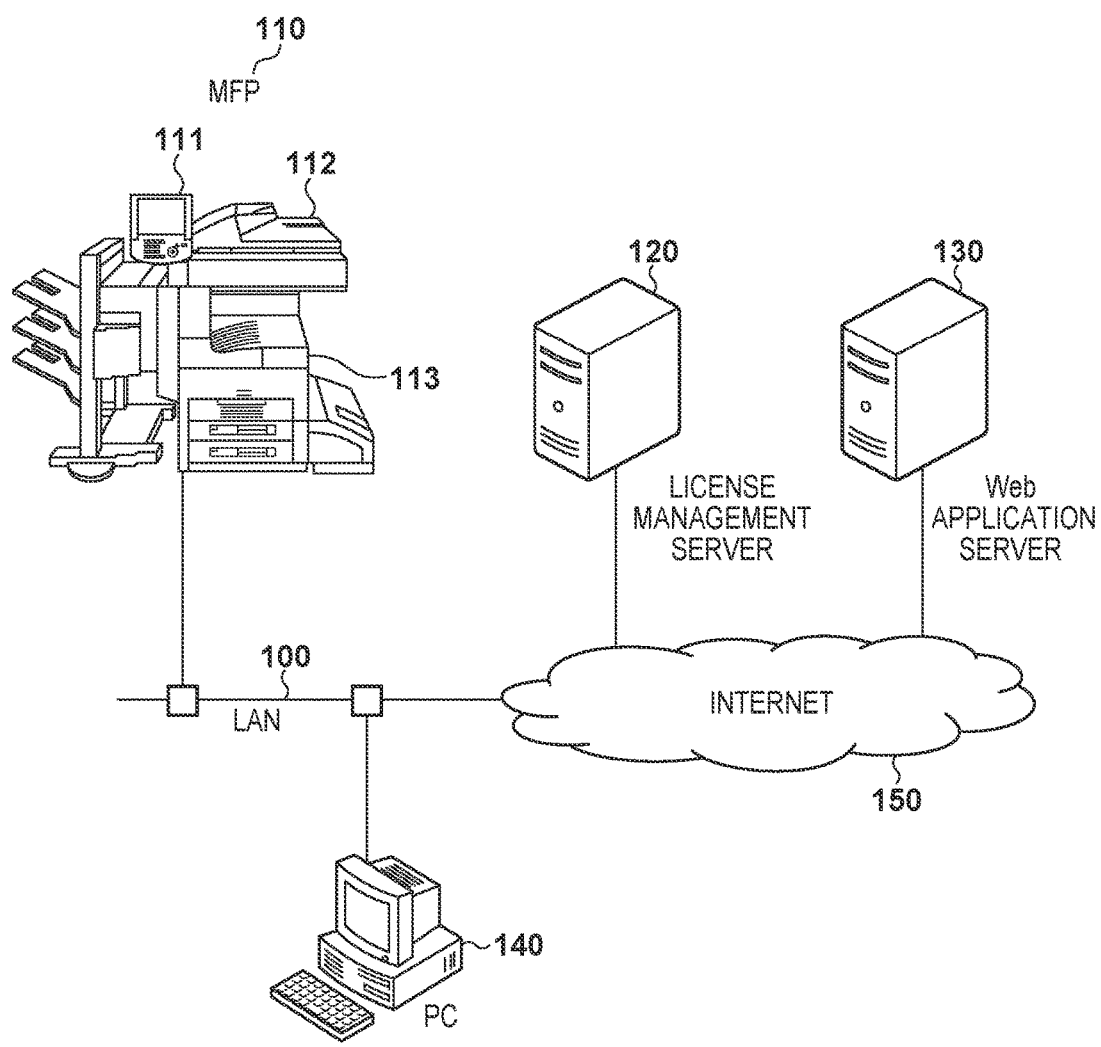
FIG. 1 is a view showing the overall arrangement of an information processing system according to an embodiment of the present invention.

FIG. 1 is a view showing the overall arrangement of an information processing system according to an embodiment of the present invention. In this information processing system, an MFP 110 and a PC 140 are connected via a LAN 100. This LAN 100 is connected to the Internet 150. Furthermore, a license management server 120 and a Web application server (a Web server or a web server) 130 are connected to the Internet 150.

The MFP 110 is a Multi Function Peripheral (multi function processing apparatus) which includes an operation unit 111, a scanner unit 112, and a printer unit 113. The MFP 110 according to the embodiment also functions as a client terminal which displays and operates the operation screen of a Web application by using an integral Web browser. The MFP 110 also has a function of providing the resources of the MFP 110 of the scanner unit 112, the printer unit 113, and the like for the Web application and MFP application. This allows the MFP 110, according to an instruction from the Web application, to print an image obtained from the Web application by using the printer unit 113 and to transmit, to the Web application, image data obtained by reading an original by using the scanner unit 112. Note that an identifier called a device ID is assigned to the MFP according to this embodiment, and each MFP can be specified and recognized uniquely by this identifier.

The license management server 120 is a server which manages the license of the MFP application. The Web application server 130 is a server which executes the Web application. The PC 140 functions as a terminal apparatus configured to perform various types of settings on the MFP 110. However, the above-described system arrangement is merely an example, and the number of these devices is not limited to this embodiment.

Hardware of MFP 110

Figure 2:
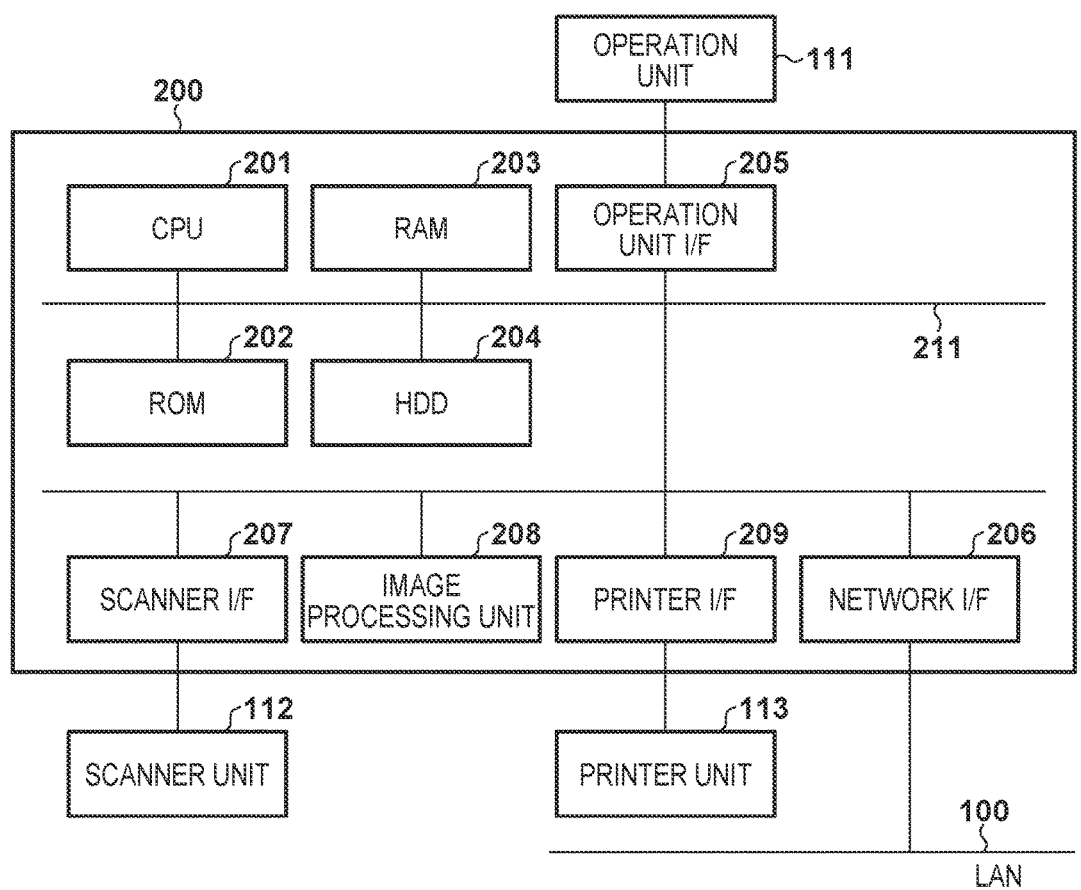
FIG. 2 is a block diagram for explaining the hardware arrangement of an MFP according to the embodiment.

FIG. 2 is a block diagram for explaining the hardware arrangement of the MFP 110 according to the embodiment. The operation unit 111 includes a display unit having a touch panel function, various hard keys, and the like, and displays information to a user in accordance with data from a control unit 200 or inputs, to the control unit 200, information according to a user operation. The scanner unit 112 reads an image on the original, creates image data of that image, and supplies it to the control unit 200. The printer unit 113 prints an image on a paper sheet based on the image data received from the control unit 200.

The control unit 200 is electrically connected to the operation unit 111, the scanner unit 112, and the printer unit 113 and is also connected to the LAN 100 via a network interface (network I/F) 206. This allows communication by a communication protocol such as TCP/IP via the LAN 100. In the control unit 200, a CPU 201, a ROM 202, a RAM 203, an HDD 204, an operation unit I/F 205, a network I/F 206, a scanner I/F 207, an image processing unit 208, and a printer I/F 209 are connected via a system bus 211. The CPU 201 executes the boot program of the ROM 202, loads an OS and a control program stored in the HDD 204 into the RAM 203, and generally controls this MFP 110 based on that program. This control also includes execution of a program to implement flowcharts to be described later. The ROM 202 stores the boot program and various kinds of data of this MFP 110. The RAM 203 provides a work memory to operate the CPU 201 and also provides an image memory to store image data temporarily. The HDD 204 is a hard disk drive, and stores the OS, various programs, and image data.

The operation unit I/F 205 is an interface unit configured to connect the system bus 211 and the operation unit 111. The network I/F 206 is connected to the LAN 100 and the system bus 211, and inputs/outputs information via the network. The scanner I/F 207 controls the interfaces between the scanner unit 112 and the control unit 200. The image processing unit 208 performs image processing such as a rotation, color conversion, image compression/decompression processing, or the like on the image data input from the scanner unit 112 and the image data output to the printer unit 113. The printer I/F 209 receives the image data processed by the image processing unit 208 and controls printing by the printer unit 113 in accordance with attribute data added to this image data. Note that in the embodiment, a description will be given by taking, as an example, the MFP capable of UI display using the operation unit 111. Instead of this MFP 110, however, an information processing apparatus, for example, a general computer or the like may be adopted.

Hardware of License Management Server

Figure 3:
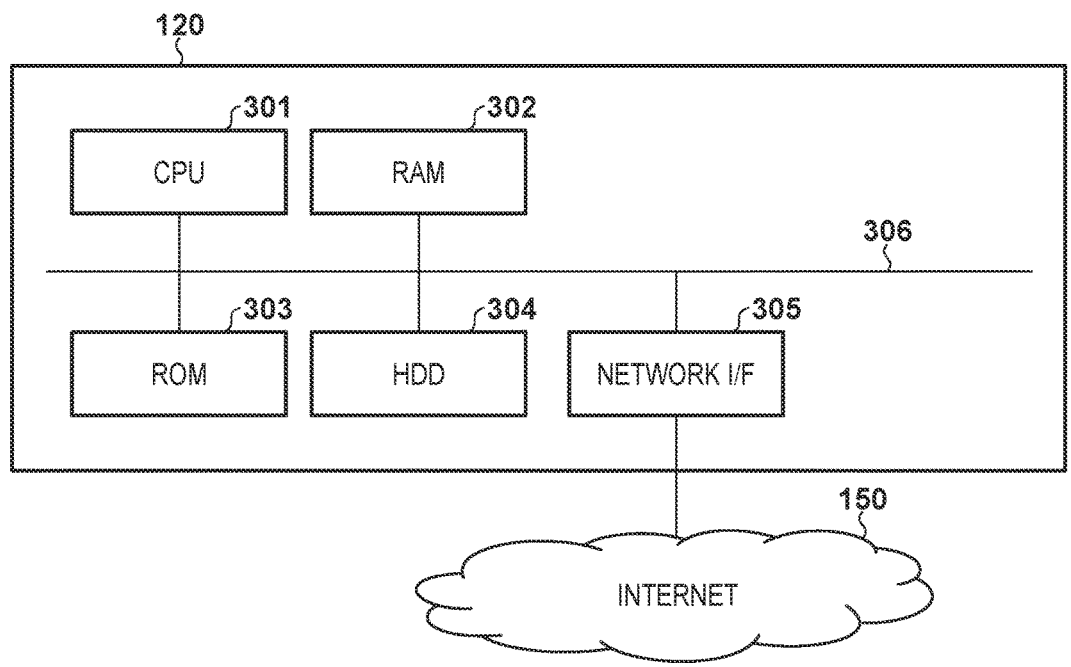
FIG. 3 is a block diagram showing the hardware arrangement of a license management server according to the embodiment.

FIG. 3 is a block diagram showing the hardware arrangement of the license management server 120 according to the embodiment. The license management server 120 includes a CPU 301, a RAM 302, a ROM 303, a hard disk drive (HDD) 304, and a network I/F 305, which are communicably connected to each other via a system bus 306. The ROM 303 stores a boot program. The CPU 301 reads out this boot program, and loads an OS installed in the HDD 304, a control program, and the like into the RAM 302 when it is powered on. Then, the CPU 301 executes the program loaded into the RAM 302, implementing the function of this license management server 120. The CPU 301 also performs communication with another apparatus on the network connected via the network I/F 305. Note that the hardware arrangements of the Web application server 130 and the PC 140 are the same as the hardware arrangement of the license management server 120 shown in FIG. 3, and thus a description thereof will be omitted.

Software of License Management Server

Figure 4:
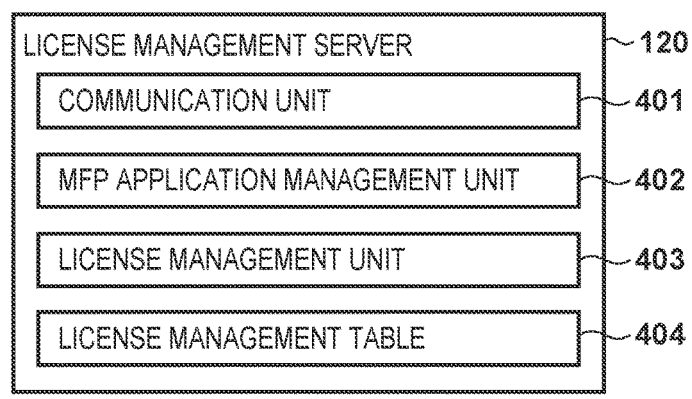
FIG. 4 is a block diagram for explaining the software module arrangement of the license management server according to the embodiment.

FIG. 4 is a block diagram for explaining the software module arrangement of the license management server 120 according to the embodiment. Programs which implement these modules are stored in the HDD 304 of the license management server 120, loaded into the RAM 302, and executed by the CPU 301, achieving the functions of these modules. The license management server 120 according to this embodiment issues a license for installing MFP applications in individual MFPs.

A communication unit 401 communicates with an external apparatus via a network, accepts a process request, and distributes a request to a license management unit 403 in accordance with that process request. An MFP application management unit 402 receives the MFP applications from an application development vendor via a terminal (not shown) connected to the Internet 150. Then, an ID for uniquely identifying the MFP application (to be referred to as an MFP application ID hereinafter) is generated and registered in a license management table 404. MFP application IDs are identification information for identifying the individual MFP applications.

The license management unit 403 issues the license for installing the MFP application in each MFP and manages a license access number for issuing the license. Upon receiving a request to issue a license access number corresponding to an MFP application to be sold from a seller selling applications, the license management unit 403 issues a license access number corresponding to the MFP application. Then, the license access number is registered in the license management table 404. Note that the license access number is a number for uniquely managing one license of the MFP application, and the application seller sells the aforementioned MFP application and this license access number together.

Moreover, upon receiving a license access number and a device ID from an MFP application purchaser, the license management unit 403 issues a license to the purchaser (user). This license issuance is a process of creating a license file corresponding to the license access number with reference to the license management table 404. Here, the MFP application ID is obtained first from the license access number. Then, a license ID is issued, the device ID and the license ID are recorded in the license management table 404, and a license file is created using information on these as one file. The license file thus created is transmitted to a request source. The license management table 404 is a database which saves information related to the license.

License Management Table and License File

FIG. 5 is a table schematically showing an example of the license management table 404 according to the embodiment.

A column 511 indicates MFP application IDs, a column 512 indicates license access numbers, and a column 513 indicates the valid periods of licenses by the numbers of days. The number of days indicates the number of days an MFP application is valid from a date and time when it is installed in the MFP. A column 514 indicates device IDs (IDs of the MFPs in which MFP applications are installed), and a column 515 indicates license IDs. A row 516 indicates an example of an MFP application whose license access number is issued, but license is unissued, and the device ID and the license ID are blank here. A row 517 indicates an example of the MFP application whose license has been issued, and a device ID (DEV001) and a license ID (LIC001) are registered. A row 518 also indicates an example of the MFP application whose license has been issued, the valid period is 60 days, a device ID (DEV002) and a license ID (LIC002) are registered.

As described above, in the license management table 404, the ID of the MFP application and the device ID of the MFP 110 in which it is installed are registered in association with each other. This makes it possible, by referring to this license management table 404, to know the specific MFP as an issuance destination of the license of the specific MFP application.

FIG. 6 is a view showing an example of a license file issued by the license management server 120 according to the embodiment. An example of a license file corresponding to the row 518 of the license management table 404 shown in FIG. 5 is shown here. The license ID (LIC002), the MFP application ID (APP712), the device ID (DEV002), and the valid period (60 days) is obtained here from FIG. 5. As described above, the license file is created based on information obtained from the license management table 404 by the license management unit 403. Thus, the MFP application purchaser can obtain a license file based on the license application number of the MFP application purchased.

MFP Software

Figure 7:
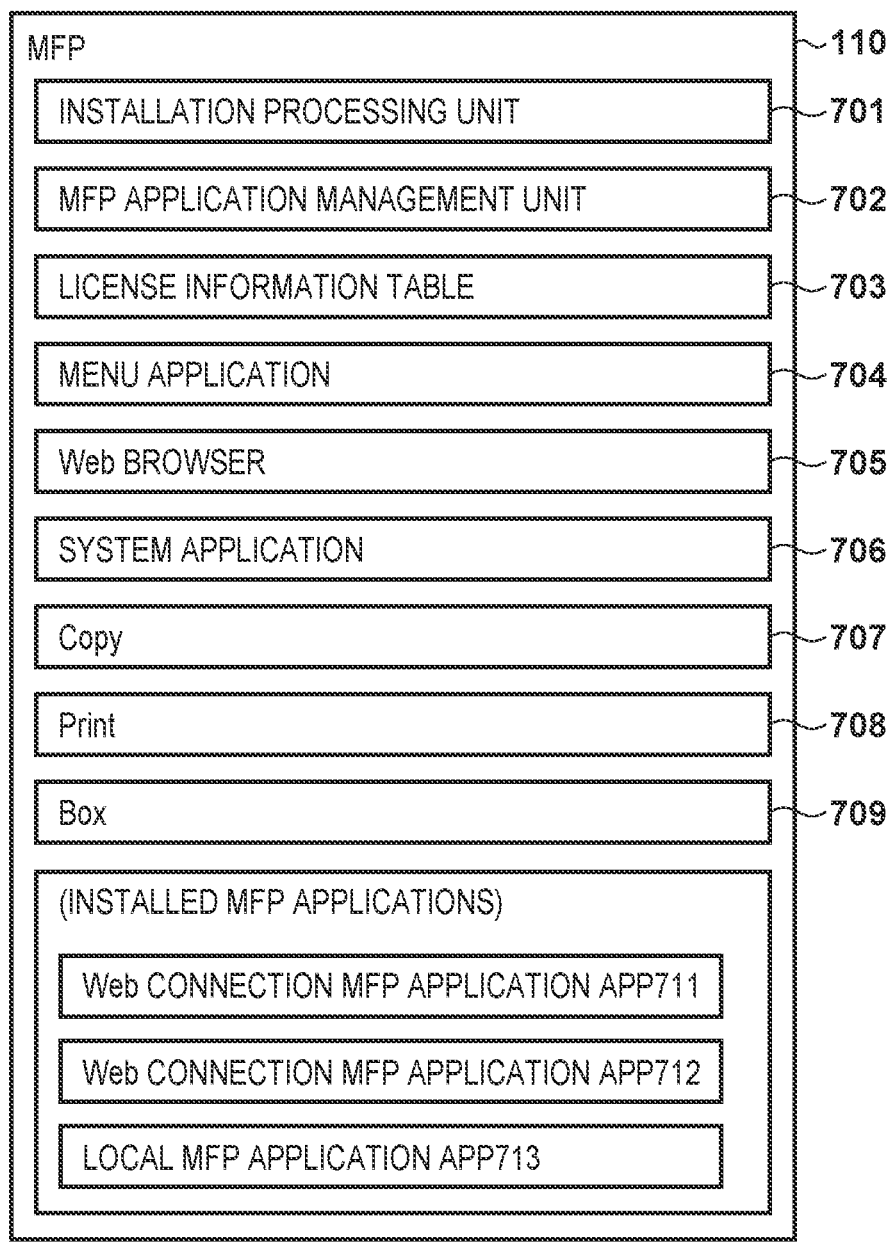
FIG. 7 is a block diagram showing applications and the software module arrangement of the MFP according to the embodiment.

FIG. 7 is a block diagram showing the software module arrangement of the MFP 110 according to the embodiment. These software modules are stored in the HDD 204 of the MFP 110 and at the time of execution, loaded into the RAM 203 and executed by the CPU 201.

An installation processing unit 701 controls installation of the MFP applications. The installation processing unit 701 is connected to the PC 140 via the network I/F 206 and installs each MFP application in accordance with an instruction from the PC 140. The installation processing unit 701 also uninstalls each MFP application in accordance with an instruction from the PC 140. An MFP application management unit 702 manages the MFP applications installed in the MFP 110. A license information table 703 is a database which saves information regarding the installed MFP applications and license files.

Figures 16, 17, 18:
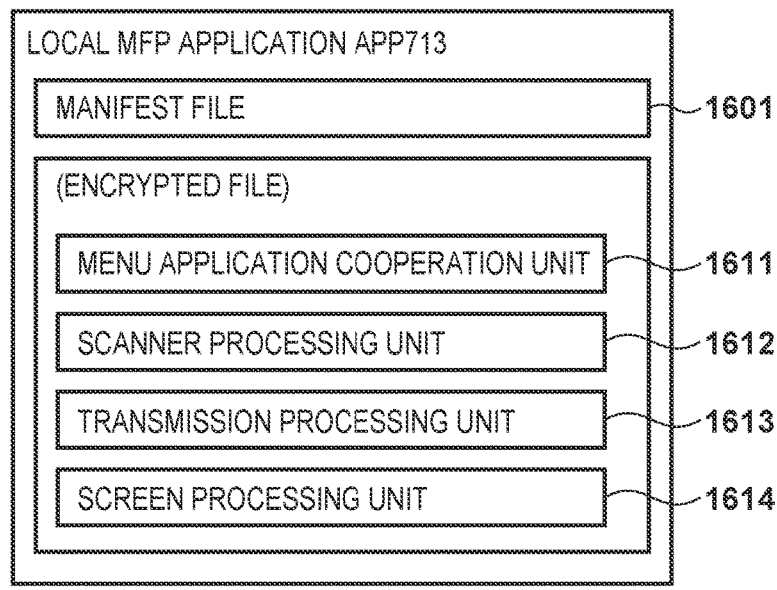
FIG. 16 is a block diagram showing the software module arrangement of a local MFP application according to the embodiment.
FIG. 17 is a view showing an example of a manifest file of the local MFP application according to the embodiment.
FIG. 18 is a table showing an example of a license information table according to the embodiment.

FIG. 18 is a table schematically showing an example of the license information table 703 according to the embodiment. This license information table 703 holds MFP application IDs 1801, valid periods 1802 of licenses, license IDs 1803, and license ID histories 1804. The license ID histories 1804 are the histories of license IDs installed in the past and are held in order to prevent reuse of the licenses.

A row 1811 indicates that a permanent license is issued with a license ID "LIC010" to an MFP application with an MFP application ID "APP711". A row 1812 indicates that a license whose valid period continues until Dec. 10, 2016 is issued with a license ID "LIC002" to an MFP application with an MFP application ID "APP712". The row 1812 also indicates that a license with a license ID "LIC003" was installed in the past. A row 1813 indicates that a permanent license is issued with a license ID "LIC011" to an MFP application with an MFP application ID "APP713".

A menu application 704 is a standard application which displays a GUI for selecting and executing the MFP application installed in the MFP 110. A Web browser 705 is a standard application which communicates with the Web application server 130. The Web browser 705 transmits a request to the Web application server 130 by using an HTTP protocol, and renders HTML data returned in response to that request and displays it on the operation unit 111 or interprets and executes JavaScript that is returned in the response. The Web browser 705 can also access a URL, that is, a designated access destination by itself. In addition to that, the Web browser 705 has a function of providing another MFP application with an access to a designated access destination. A system application 706 is a standard application which controls error processing occurred in the MFP 110, the notification of the state change of the operation unit 111, and the like. The error processing detects a paper jam or the like occurring in the printer unit 113 or the scanner unit 112, displays a state, and controls display for solving the paper jam. Copy 707, Print 708, and Box 709 are standard applications for using a storage space provided in the printer unit 113, the scanner unit 112, and the HDD 204 that are mounted in the MFP 110 in advance.

Installation of an MFP application by the MFP application purchaser will now be described. The user uses the PC 140 to transmit, to the installation processing unit 701, an application and a license file. In response to this, the installation processing unit 701 performs installation processing of that MFP application. The MFP application is passed to the application management unit 702 and saved in the HDD 204. At this time, a device ID described in the license file is compared with a device ID set in the MFP 110 in advance to determine whether the license file is a correct license file. A date and time at which the MFP application becomes invalid is calculated from a current date and time, and a valid period described in the license file, and is managed in the MFP application management unit 702 as a last valid date and time. The MFP application is a program described by, for example, Java®. If the MFP application is a Java® program, the MFP 110 includes a platform as an execution environment where the MFP application is to be executed.

Local MFP Application and Web Connection MFP Application

In FIG. 7, three MFP applications of APP711, APP712, and APP713 are installed as an example of the embodiment. Note that in this embodiment, two types of MFP applications, namely, a Web connection MFP application and a local MFP application are defined as the MFP applications. The simple description of an "MFP application" is a general term for the Web connection MFP application and the local MFP application. The simple description of "the applications" is a general term for the MFP application and a standard application. APP711 and APP712 are the Web connection MFP applications, and APP713 is the local MFP application.

Each Web connection MFP application is an application for executing, from the MFP 110, a function provided by a Web application arranged in the Web server. Each Web connection MFP application is connected to the Web application by using the Web browser 705 and executes, from the MFP 110, the function provided by the Web application. Each Web connection MFP application is associated with a corresponding one of certain Web applications. In some cases, each Web application is further executed by using the function of a device provided by the MFP 110 of an access source. The Web connection MFP applications will be described in detail later with reference to FIG. 8.

On the other hand, the local MFP application is an application which provides the MFP 110 with a function using the scanner unit 112, printer unit 113, image processing unit 208, or the like of the MFP 110 as a software module. The local MFP application executes the function provided by itself in the MFP 110 by calling its own software module. The local MFP application will be described in detail later with reference to FIG. 16. Note that the type and number of MFP applications installed in the MFP are different for each MFP.

Software of Local MFP Application

FIG. 16 is a block diagram showing the software module arrangement of the local MFP application according to the embodiment. The local MFP application has a different software module arrangement depending on a function to be provided. FIG. 16 shows, as an example, the software module arrangement of the local MFP application which provides a function of externally transmitting the original read by the scanner unit 112 via the network I/F 206. These software modules presented in FIG. 16 are stored in the HDD 204 of the MFP 110 and at the time of execution, loaded into the RAM 203 and executed by the CPU 201.

A manifest file 1601 is a file which describes basic information of the MFP application. FIG. 17 shows an example of the manifest file according to the embodiment. An MFP application ID 1701 and an application name 1702 are defined in the manifest file. The MFP application ID 1701 is the same ID as that managed in the license management table 404. The application name 1702 represents the name of the MFP application.

A menu application cooperation unit 1611 is a module which cooperates with the menu application 704 and registers a GUI button for calling the local MFP application in the menu application 704. A scanner processing unit 1612 is a module for reading an original by using the scanner unit 112. A transmission processing unit 1613 is a module for externally transmitting the original read by the scanner processing unit 1612 via the network I/F 206. A screen processing unit 1614 is a module for displaying, on the operation unit 111, the operation screen of local MFP application APP713.

The local MFP application has a different function to implement for each application, and thus the application development vendor needs to perform programming on a software module for implementing the function for each application.

Software of Web Connection MFP Applications

Figure 8:
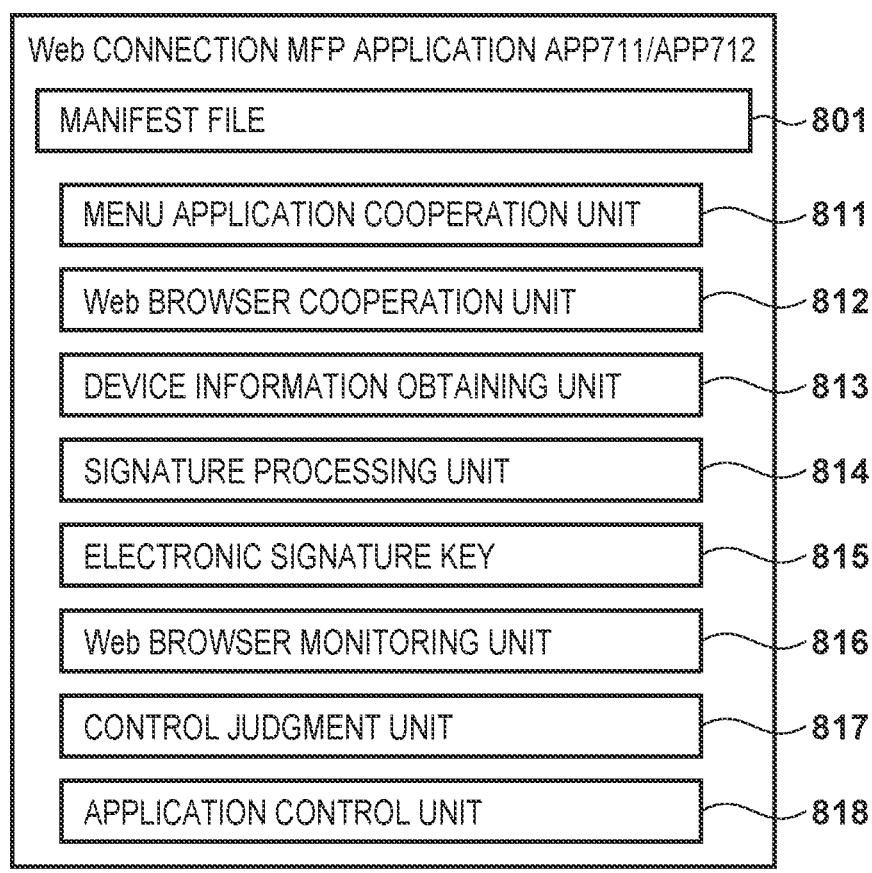
FIG. 8 is a block diagram showing the software module arrangements of Web connection MFP applications according to the embodiment.

FIG. 8 is a block diagram showing the software module arrangements of the Web connection MFP applications according to the embodiment. Each Web connection application holds setting information needed for each Web application in a manifest file 801 or an electronic signature key 815. That is, one Web connection MFP application is needed for one Web application. The Web connection MFP application according to the Web application to be used is installed in the MFP 110. When a plurality of Web applications are used, a plurality of Web connection MFP applications are installed in the MFP 110. In that case, the plurality of Web connection MFP applications share one Web browser 705. These software modules presented in FIG. 8 are stored in the HDD 204 of the MFP 110 and at the time of execution, loaded into the RAM 203 and executed by the CPU 201.

The manifest file 801 is a file that describes the basic information of each MFP application and information for being connected to a corresponding one of the Web applications. FIG. 9 shows an example of a manifest file according to the embodiment. An MFP application ID 901, an application name 902, a Web application URL (or top page URL) 903, a context root URL 904, an SSB setting 905, and a device information list 906 are defined in the manifest file.

The MFP application ID 901 and the application name 902 are defined in the same manner as the manifest file of the local MFP application presented in FIG. 17. The Web application URL 903, the context root URL 904, the SSB setting 905, and the device information list 906 are information unique to Web connection MFP application.

The Web application URL 903 represents the URL of the top page of the Web application. The context root URL 904 represents the uppermost path of the Web application. The SSB (Site Specific Browser) setting 905 represents setting values set in the Web browser when this MFP application is connected to the Web application. The SSB setting is made of a setting regarding the UI of the Web browser and a setting regarding communication. As examples of the setting regarding the UI of the Web browser, there are a restriction on file upload, a restriction on hiding of a toolbar or URL input, a restriction on addition of favorites, and the like. As examples of the setting regarding communication, there are a processing method of Cookie, a display restriction on mixed page of HTTPS/HTTP, usability of a cache, and the like. It is possible, by performing the SSB setting for each MFP application connected to the Web application, to perform a dedicated Web browser setting for each Web application. When the SSB setting is not used, permission is even granted to not define the SSB setting 905 in the manifest file. Note that FIG. 27 shows setting item examples of the SSB setting. FIG. 27 shows an example of setting items in the SSB setting. For example, "rest_toolbar 1" is defined in the manifest file when a display restriction on a button portion of a toolbar is turned on. When the restriction on file upload is to be imposed or removed, it is possible to use file_upload. It is also possible to eliminate an access history, although not shown in FIG. 27. It is thus possible to include a setting item not shown in FIG. 27 as well. Options such as start of the scanner and printer can further be included. The device information list 906 represents the list of device information notified when the top page of the Web application is called. The device information is information regarding the MFP 110 and is, for example, information which specifies the individual type or model type of MFP 110, an optional function valid in the MFP 110, a log-in user name, a software version, or the like. When the device information need not be obtained, permission is even granted to not define the device information list 906 in the manifest file.

A menu application cooperation unit 811 is a module which cooperates with the menu application 704 and registers a GUI button for calling each Web connection MFP application in the menu application 704. A Web browser cooperation unit 812 is a module for operating the Web browser 705 and passes the URL of each Web application to the Web browser 705 or displays the Web browser 705 in the foreground of the operation unit 111. A device information obtaining unit 813 obtains device information designated in the device information list 906. A signature processing unit 814 generates an electronic signature added when connected to each Web application. The electronic signature is generated by using an electronic signature key 815. The electronic signature is used by each Web application to check that a calling is from a corresponding one of the Web connection MFP applications. Each Web application is free to omit this check. In that case, the electronic signature is not needed, and thus the Web connection MFP application has an arrangement without the electronic signature key 815.

A Web browser monitoring unit 816 is a module which monitors the state of the Web browser and monitors whether the Web browser is displayed on the operation unit 111. A control judgment unit 817 judges whether to control the state of the Web browser. If the control judgment unit 817 judges, in a judgment of whether to control the state of the Web browser, the state to be controlled, an application control unit 818 executes the state control of the Web browser via the Web browser cooperation unit 812. If the application control unit 818 controls so as not to display the Web browser on the operation unit 111 upon executing the state control of the Web browser, it executes control so as to display a menu application on the operation unit 111 via the menu application cooperation unit 811.

Note that the individual Web connection MFP applications are different only in electronic signature key 815 and the description of the manifest file 801, and other software modules are the same among all Web connection MFP applications. That is, if the software modules are diverted, it is possible to create a Web connection MFP application just by defining information regarding a Web application. For example, if the information regarding the Web application is input, it is possible to create the Web connection MFP application easily by preparing a tool which outputs the Web connection MFP application.

The created Web connection MFP application is integrated into one file of the files of the software modules other than the manifest file 801 by transmitting it to the license management server 120.

Software of Web Application Server

Figure 10:
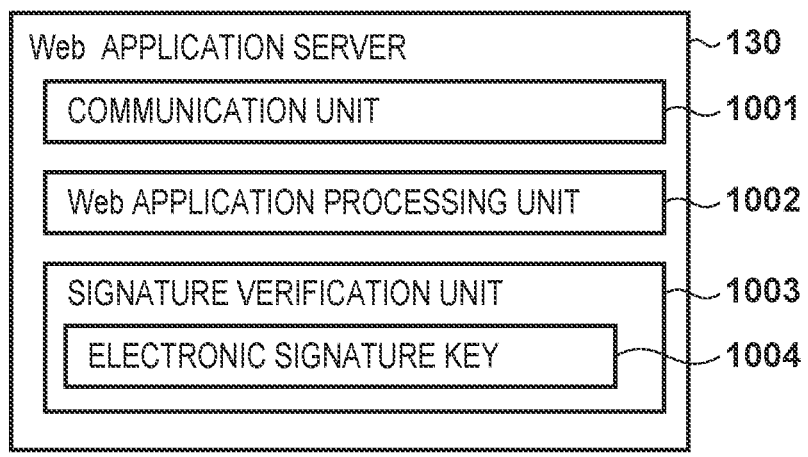
FIG. 10 is a block diagram showing the software module arrangement of a Web application server according to the embodiment.

FIG. 10 is a block diagram showing the software module arrangement of the Web application server 130 according to this embodiment. These software modules are stored in the HDD 304 of the Web application server 130 and at the time of execution, loaded into the RAM 302 and executed by the CPU 301, achieving the functions of these software modules.

A communication unit 1001 communicates with an external apparatus via a network and accepts or responds to a request. In accordance with a request from the MFP 110 by the HTTP protocol, a Web application processing unit 1002 generates an HTML content displayed by the Web browser 705 of the MFP 110 or generates a content for operating the MFP 110. A signature verification unit 1003 includes an electronic signature key 1004 corresponding to the electronic signature key 815 included in each Web connection MFP application shown in FIG. 8 and verifies signature information with an electronic signature by this key. It is possible, by verifying the electronic signature, to judge whether the request is from the MFP 110 in which the Web connection MFP application is installed. In this example, an HMAC (Hash-based Message Authentication Code) is used for an electronic signature technique as an example. That is, the electronic signature key 815 and the electronic signature key 1004 are the same private key (common key). Note that another technique may be used for an electronic signature. For example, if a digital signature is used as the electronic signature technique, the digital signature is in a public key cryptosystem. Accordingly, the electronic signature key 815 for each Web connection MFP application is a private key, and the electronic signature key 1004 of the Web application server 130 is a public key corresponding to that private key.

Installation Processing of MFP Application

Figure 11:
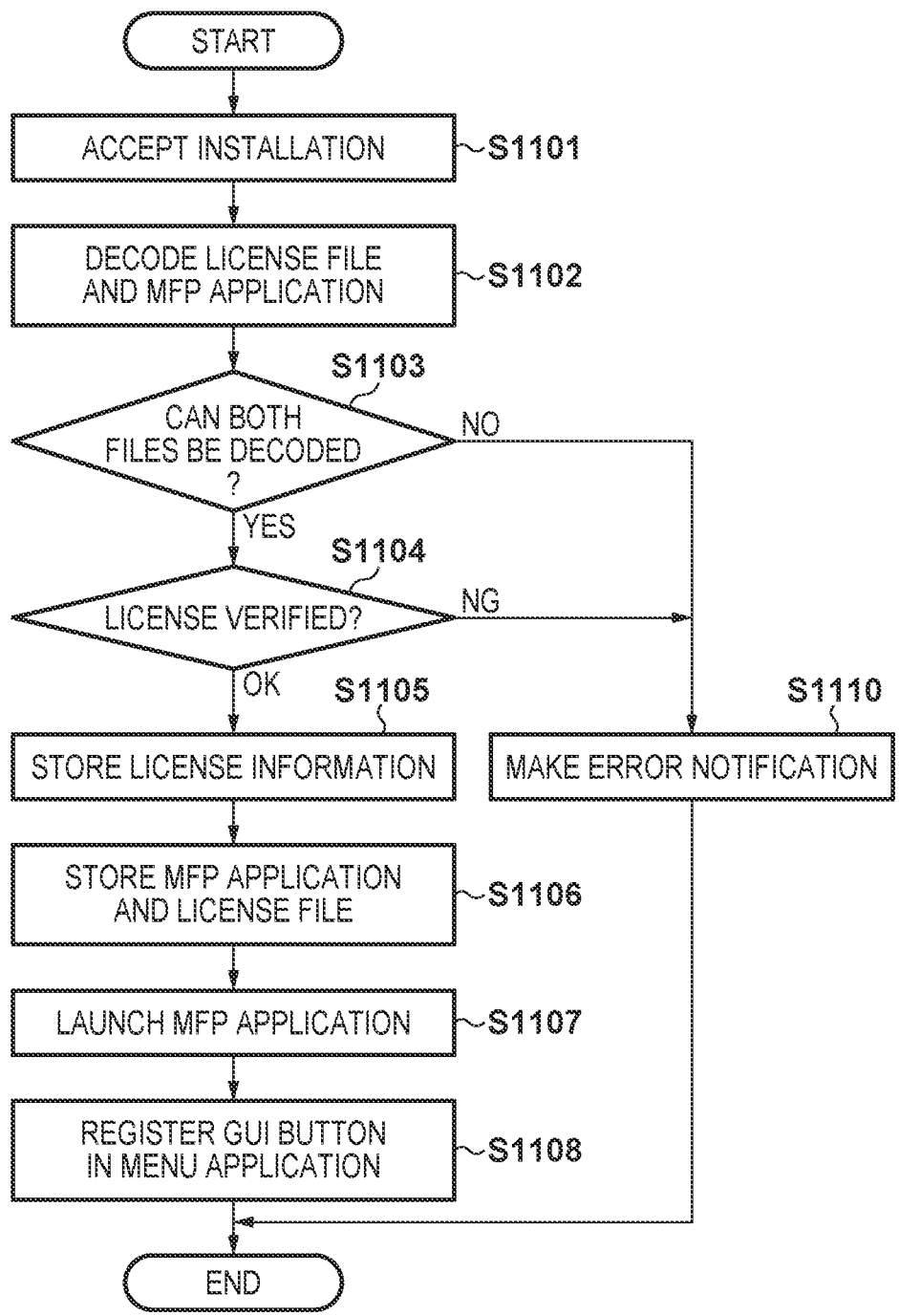
FIG. 11 is a flowchart showing an example of processing in the MFP according to the embodiment.

FIG. 11 is a flowchart for explaining installation processing of an MFP application performed by the MFP 110. Each step of the flowchart in FIG. 11 is performed by causing the CPU 201 to read out a program stored in the HDD 204 of the MFP 110 to the RAM 203, and analyze and execute it.

As an advance preparation, the MFP application purchaser receives the MFP application and the license access number from the MFP application seller, and receives the license file from the license management server 120, as described above.

First, the installation processing unit 701 receives, from the PC 140 operated by the MFP application purchaser, an MFP application and a license file as an installation instruction (step S1101). In step S1102, the installation processing unit 701 decodes the received license file and MFP application. For example, the MFP 110 is given a decoding private key in advance and decodes, with the private key, the MFP application and license file encrypted with a public key. In step S1103, it is determined whether decoding of both files succeeds. If decoding fails, the process advances to step S1110. If the decoding succeeds, the process branches to step S1104. In step S1104, the license is verified. In order to do this, a device ID described in the license file is compared with a device ID set in the MFP 110 in advance to determine whether the license file is a correct license file compatible with the MFP 110. If it is determined that the license file is correct, the installation processing unit 701 advances the process to step S1105. If it is determined that the license file is not the correct license file, the installation processing unit 701 makes an error notification (step S1110) and terminates the process.

In step S1105, the installation processing unit 701 stores license information in the license information table 703. The license information includes an MFP application ID, a license ID, and the valid period of the license. Note that the installation processing unit 701 calculates, from the valid period, and current date and time recorded in the license file, a date and time at which the MFP application becomes invalid and registers it as the valid period of the license. If the valid period recorded in the license file is permanent, the valid period is directly registered as permanent valid period.

Then, the installation processing unit 701 saves the MFP application and the license file in the HDD 204 (step S1106). Subsequently, the installation processing unit 701 reads out the MFP application saved in the HDD 204 to the RAM 203 and launches it (step S1107). If the MFP application to be launched is a Web connection MFP application, the Web browser monitoring unit 816 starts monitoring the display application of the operation unit 111. More specifically, if an application displayed on the operation unit 111 is changed from the system application 706, the Web browser monitoring unit 816 is notified of this, and a reception processing is started. Then, the launched MFP application registers a GUI button for calling the MFP application in the menu application (step S1108). At this time, if the launched MFP application is a Web connection MFP application, the menu application cooperation unit 811 performs the process in step S1108. On the other hand, if the launched MFP application is a local MFP application, the menu application cooperation unit 1611 performs the process in step S1108. Alternatively, if a local MFP application does not have a screen to display on the operation unit 111 and need not register the GUI button in the menu application, the process in step S1108 is skipped.

Figure 12:
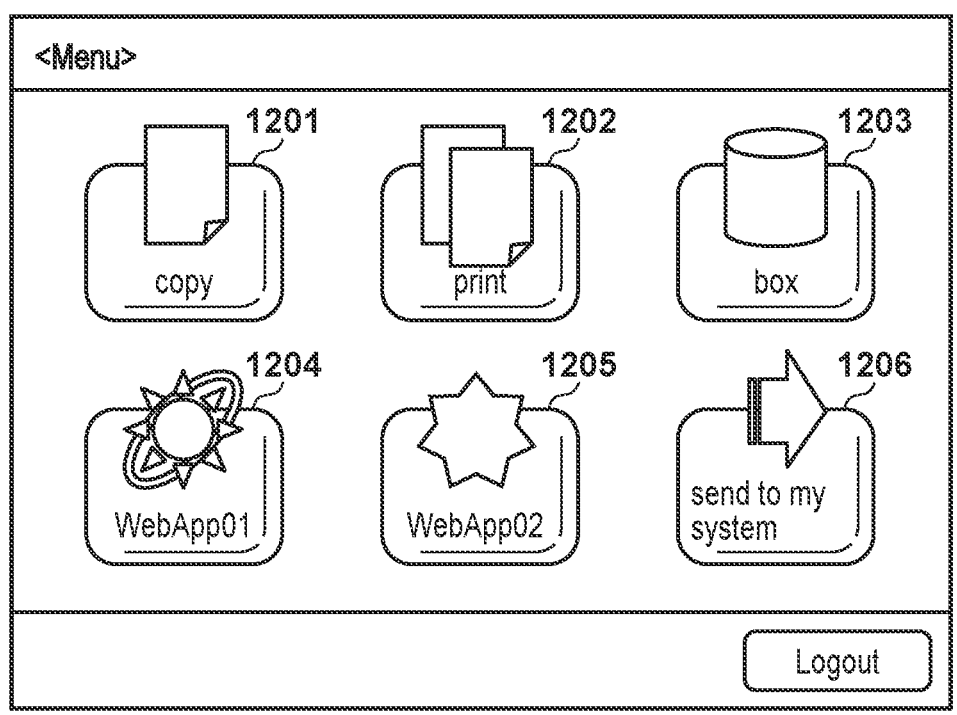
FIG. 12 is a view showing an example of GUIs displayed on an operation unit of the MFP according to the embodiment.

FIG. 12 is a view showing an example of GUIs displayed on the operation unit 111 when the menu application 704 of the MFP 110 is called in a state in which the MFP applications APP711, APP712, and APP713 are installed in the MFP 110 according to the embodiment. GUI buttons 1201, 1202, and 1203 are GUI buttons for calling the standard applications 707, 708, and 709 that are originally provided in the MFP 110.

A GUI button 1204 is a GUI button for calling the Web connection MFP application APP711. A GUI button 1205 is a GUI button for calling the Web connection MFP application APP712. A GUI button 1206 is a GUI button for calling the local MFP application APP713. The GUI buttons 1204 and 1205 are registered in step S1108 of FIG. 11. As shown in FIG. 12, the menu application 704 displays the GUI buttons without distinguishing the types of MFP applications.

The GUI buttons are selectable only in a period during which their licenses are valid. For example, if APP712 is installed with a license valid for 60 days, the GUI button 1205 is valid for 60 days after its installation but becomes invalid from the 61st day. After the GUI button 1205 becomes invalid, it becomes impossible to call the MFP application APP712 corresponding to it, also disabling connection to the Web application. This license management is performed by, for example, the menu application 704. Data and a procedure for this will be described with reference to FIGS. 21 and 19.

License Management by Menu Application

Figures 20, 21:
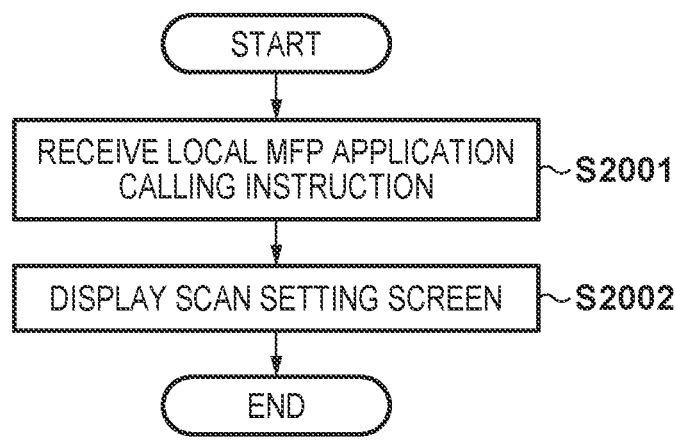
FIG. 20 is a flowchart showing a process in the MFP according to the embodiment.
FIG. 21 is a table showing an example of a management table of display identifiers used for the display control of an MFP 1100 in the MFP according to the embodiment.

FIG. 21 is a table showing display control identifiers used to display the Web browser, the menu application, a system application, and the MFP applications on the operation unit 111 of the MFP 110 in order to control the operation unit 111 in the MFP 110, and is managed by the system application 706. An application corresponding to each of these display identifiers is displayed on the operation unit 111 when the identifier is instructed by the operation unit I/F 205. An application type 2101 indicates the type of application, and an identifier 2102 indicates a display identifier. For example, a row 2111 indicates that the identifier of the Web browser is AAA111, and a row 2112 indicates that the identifier of the menu application is AAA112. Note that these identifiers can identify the applications displayed on the operation unit 111 via the operation unit I/F.

Figure 19:
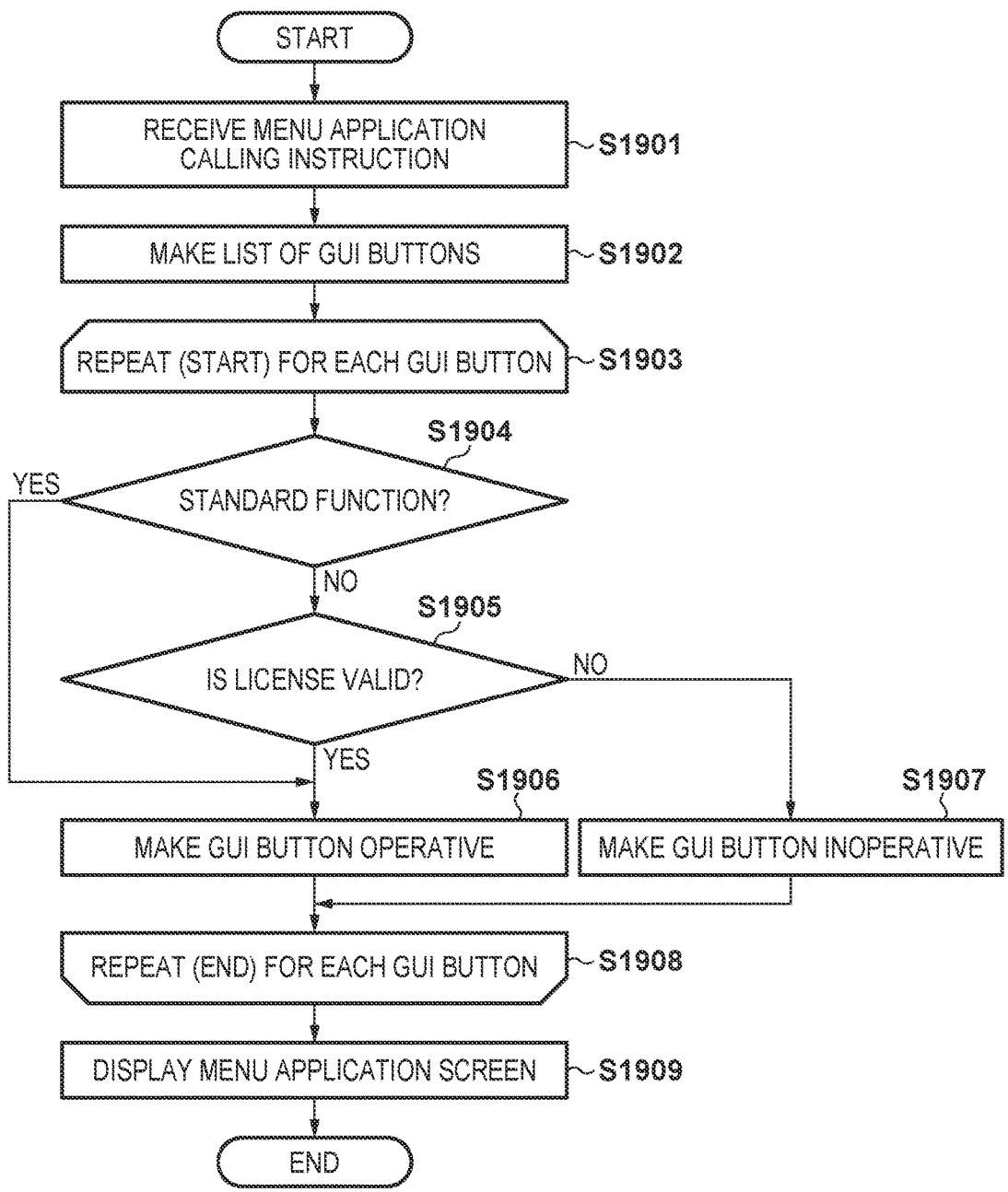
FIG. 19 is a flowchart showing a process in the MFP according to the embodiment.

FIG. 19 is a flowchart for explaining a process performed when the menu application 704 receives a calling instruction. The menu application 704 confirms the licenses of the MFP applications corresponding to the GUI buttons and makes only the buttons of the MFP applications with valid licenses selectable. Each step of the flowchart in FIG. 19 is performed by causing the CPU 201 to read out a program stored in the HDD 204 of the MFP 110 to the RAM 203, and analyze and execute it.

Upon receiving the calling instruction (step S1901), the menu application 704 makes a list of GUI buttons registered in itself (step S1902). The calling instruction to the menu application 704 can be issued, for example, during an activation process when the MFP 110 is powered on. Then, the menu application 704 repeats, for each GUI button, the processes from steps S1903 to S1908 in order to verify the validity of the listed GUI button. Steps S1903 and S1908 indicate that each step between them is performed repeatedly for each GUI button.

Focusing on one GUI button, the menu application 704 discriminates whether the GUI button corresponds to an originally provided application (that is, a standard function) (step S1904). If the GUI button corresponds to the originally provided application, the process advances to step S1906. If the GUI button corresponds to an MFP application installed later, the process advances to step S1905. In step S1905, the menu application 704 discriminates the license valid period of the MFP application corresponding to the GUI button by using the license information table 703. If the menu application 704 determines that the license is valid, the process advances to step S1906. If the menu application 704 determines that the license is expired, the process advances to step S1907. In step S1906, the menu application makes a target GUI button operative. On the other hand, in step S1907, the menu application makes a target GUI button inoperative. Making the GUI button inoperative includes, for example, hiding the GUI button itself or setting the GUI button in a state in which it is displayed but cannot be pressed. Alternatively, a message that the license is expired may be displayed after the GUI button is pressed. The menu application 704 advances the process to step S1909 after the processes for all the GUI buttons are completed. If there are unprocessed GUI buttons, the processes from step S1904 targeted for any of them are repeated.

Finally, the menu application 704 displays, on the operation unit 111, the screen of the menu application shown in FIG. 12 and terminates the process (step S1909). More specifically, the menu application is displayed by instructing the operation unit I/F 205 to display the display identifier 2112 of the menu application.

Calling and Execution of MFP Application

FIG. 20 is a flowchart for explaining a process when the local MFP application receives a calling instruction from the screen shown in FIG. 12. Each step of the flowchart in FIG. 20 is performed by causing the CPU 201 to read out a program stored in the HDD 204 of the MFP 110 to the RAM 203, and analyze and execute it. A description will be given here by taking, as an example, a case in which the local MFP application APP713 shown in FIG. 16 is called.

The menu application cooperation unit 1611 of the local MFP application receives a calling instruction from the menu application 704 that has received pressing of the GUI button by the user (step S2001). Then, the screen processing unit 1614 displays, on the operation unit 111, a scan setting screen as the initial screen of the local MFP application APP713 and terminates the process (step S2002).

Figure 13:
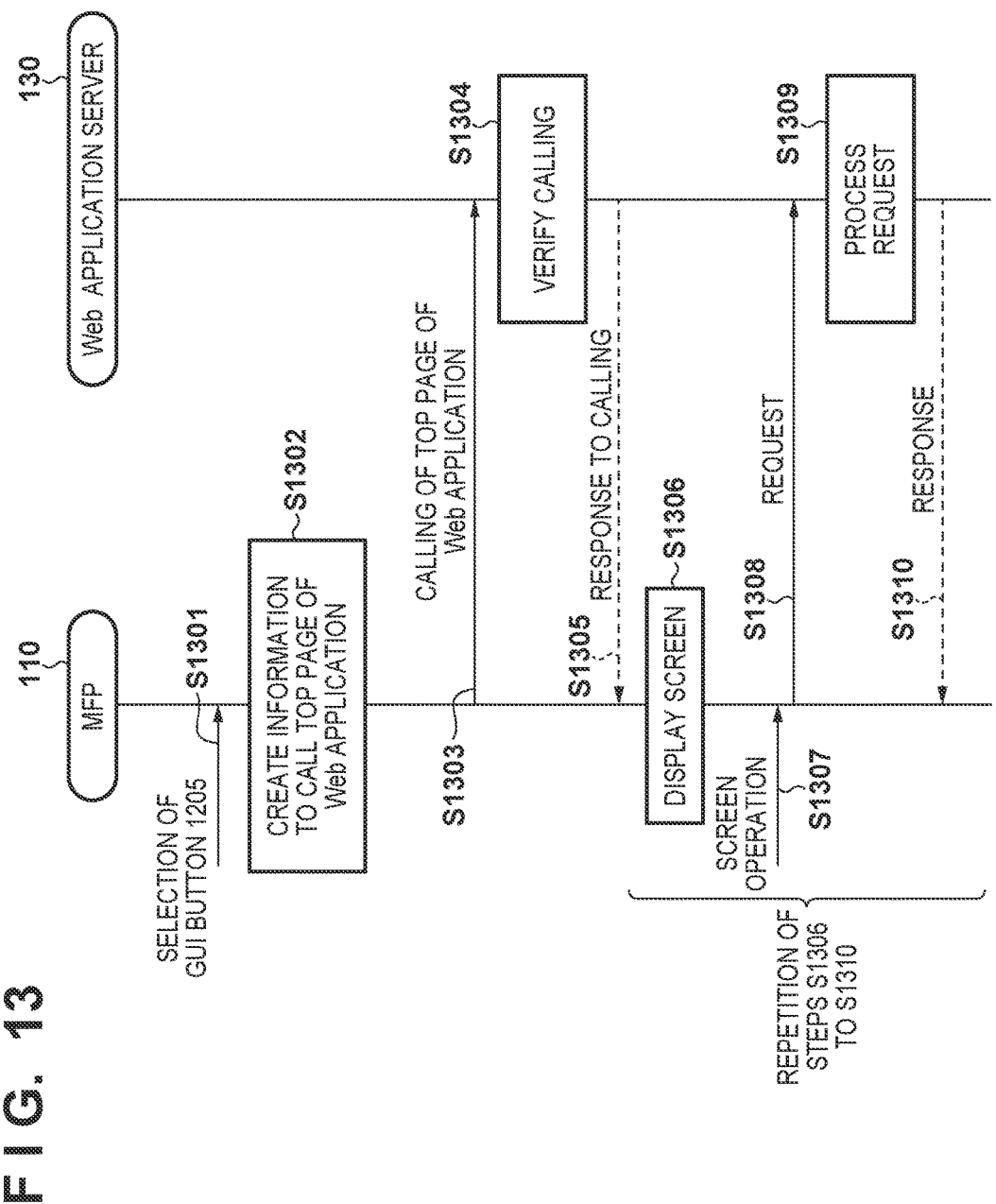
FIG. 13 is a sequence chart showing an example of processes in the image processing system according to the embodiment of the present invention.

FIG. 13 is a sequence chart showing the sequence of a series of processes when the Web application is used from the MFP 110. A process in a case in which the user selects the GUI button 1205 displayed in the menu application 704 will be described here as an example. Note that the menu application 704 can also start a process equal to that in a case in which the GUI 1205 is selected by, for example, a hard key arranged on the operation unit 111 of the MFP 110 other than the GUI button. In this sequence, a case in which the GUI button is selected will be described as an example for the sake of convenience.

First, upon accepting pressing of the GUI button 1205 by the user, the menu application 704 of the MFP 110 calls the MFP application APP712 corresponding to the GUI button 1205 (step S1301). Based on information defined in the manifest file of the MFP application APP712, the called MFP application APP712 creates information needed to call the top page of the Web application (step S1302). The information needed to call the top page of the Web application includes the device information defined in the device information list 906, the electronic signature created using the electronic signature key 815, and the like. Subsequently, the MFP application APP712 uses the Web browser 705 to which the SSB setting defined in the manifest file is applied to call the top page of the Web application based on the information created in step S1302 (step S1303).

Upon the calling, the Web application server 130 verifies the calling (step S1304). As a verification of the calling, it is confirmed that, for example, the Web connection MFP application APP712 is called from the installed MFP 110 by checking the validity of an electronic signature. On the basis of a verification result, the Web application server 130 makes a response to the calling to the MFP 110 (Web browser 705) (step S1305). If the verification result is OK, the Web application server 130 responds with the HTML content for forming a screen needed for a next operation.

The Web browser 705 renders the received HTML and displays a screen on the operation unit 111 (step S1306). Upon receiving a screen operation instruction of the user (step S1307), the Web browser 705 then transmits a request corresponding to it to the Web application server 130 by the HTTP protocol (step S1308).

The Web application server 130 receiving the request performs processing on the request (step S1309) and based on a processing result, responds to the MFP 110 (Web browser 705) with the HTML content for forming the next screen (step S1310). After that, a screen transition and the process of the Web application are implemented by repeating steps from S1306 to S1310.

Access Processing to Web Application by Web Connection MFP Application

Figure 14:
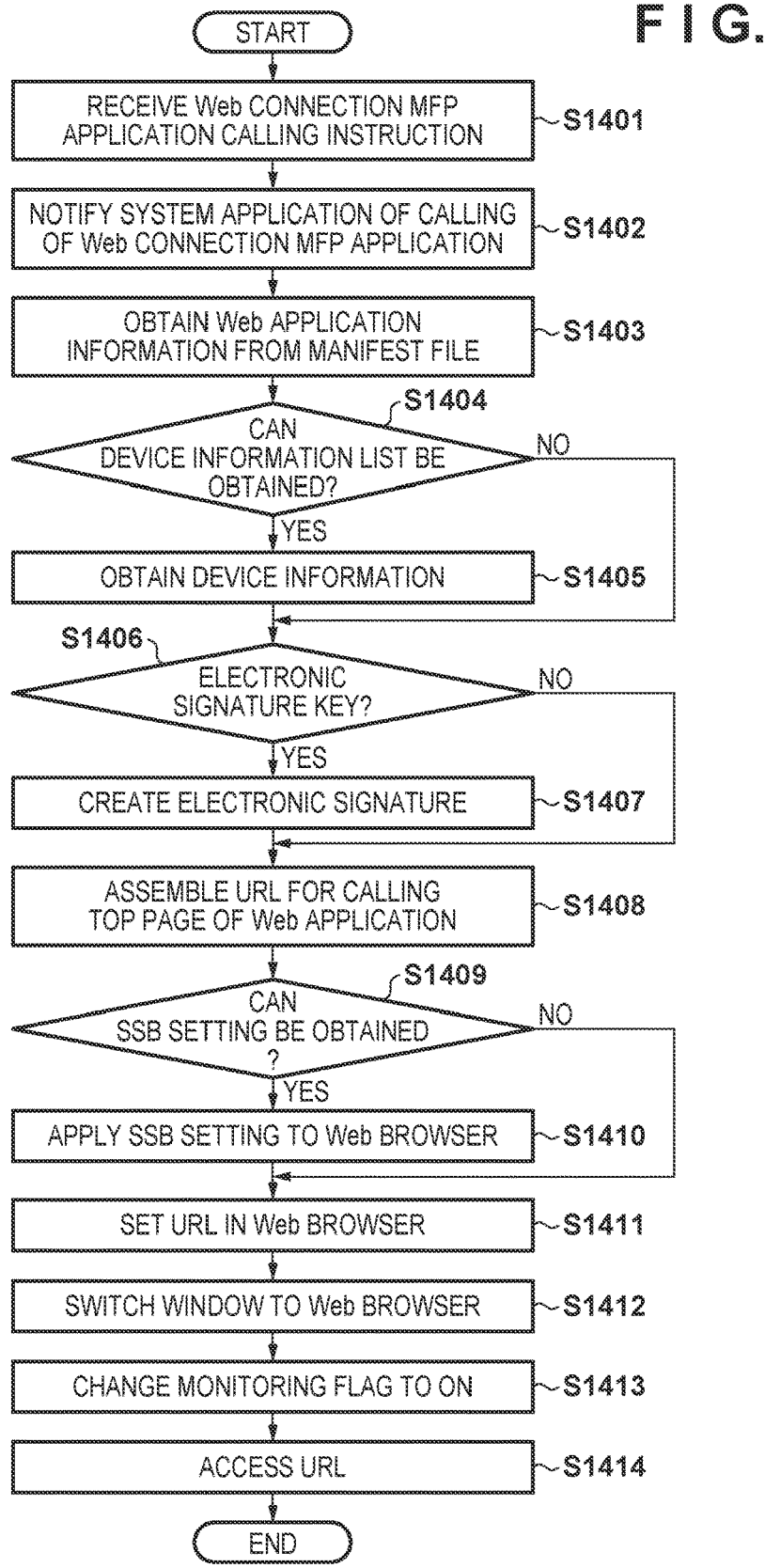
FIG. 14 is a flowchart showing an example of processing in the MFP according to the embodiment.

FIG. 14 is a flowchart for explaining processing when the Web connection MFP application calls the top page of the Web application. Each step of the flowchart in FIG. 14 is performed by causing the CPU 201 to read out a program stored in the HDD 204 of the MFP 110 to the RAM 203, and analyze and execute it. The flowchart of FIG. 14 describes the processes from steps S1301 to S1303 of FIG. 13 in detail. Step S1301 of FIG. 13 corresponds to step S1401 in FIG. 14. Step S1302 of FIG. 13 corresponds to steps from S1402 to S1413 in FIG. 14. Step S1303 of FIG. 13 corresponds to step S1414 in FIG. 14.

The menu application cooperation unit 811 of the Web connection MFP application receives the calling instruction from the menu application 704 that has received pressing of the GUI button by the user (step S1401).

Then, the application control unit 818 of the Web connection MFP application notifies the system application 706 that the calling instruction of the Web connection MFP application is generated (step S1402). This notification contains information on the display identifier of the Web browser. With this notification, the system application 706 starts monitoring the non-display of the application of the passed display identifier (in this case, the Web browser).

Then, the Web browser cooperation unit 812 obtains, from the manifest file 801, the top page URL 903, SSB setting 905, and device information list 906 of the Web application information (step S1403). Note that depending on the Web connection MFP application, the SSB setting 905 and the device information list 906 may not be defined in the manifest file 801. In that case, the Web browser cooperation unit 812 obtains only defined information.

If the device information list 906 is obtained in step S1403, the device information obtaining unit 813 obtains device information listed in the device information list 906 (steps S1404 and S1405). According to the manifest file 801 presented in FIG. 9, the device information obtaining unit 813 obtains device information corresponding to user_id, device_id, device_model, encrypt_pdf, and print_service_ver. user_id represents the ID of the user logging in to the MFP 110. device_id represents the device ID of the MFP 110. device_model represents the model type of MFP 110. encrypt_pdf represents the installation status of an encrypted PDF option. print_service_ver represents the software version of a WebService module for requesting for printing from the Web application to the MFP 110. The device information list 906 of FIG. 9 is an example, and obtainable device information is not limited to these.

If the Web connection MFP application includes the electronic signature key 815, the signature processing unit 814 then creates the electronic signature (steps S1406 and S1407). The signature processing unit 814 uses a signature character string as a message and the electronic signature key 815 as a private key to calculate a message digest (HMAC value) with a hash function and sets it as an electronic signature. The signature character string is obtained by coupling, as a character string, the top page URL 903, the system time (to be referred to as the time stamp hereinafter) of the MFP 110, and the device information obtained in step S1405 if any.

Subsequently, the Web browser cooperation unit 812 assembles an URL for calling the top page of the Web application (step S1408). If there is the device information obtained in step S1405, the Web browser cooperation unit 812 adds the information to the top page URL 903 as a query character string. Furthermore, if there are the time stamp and electronic signature obtained in step S1407, the Web browser cooperation unit 812 also adds information thereof to the top page URL 903 as a query character string.

The Web browser cooperation unit 812 discriminates whether the SSB setting 905 is obtained (step S1409). If the SSB setting is not obtained, the process proceeds to step S1411 without applying the SSB setting. On the other hand, if the SSB setting is obtained in step S1403, the Web browser cooperation unit 812 applies the SSB setting to the Web browser 705 (step S1410). According to the SSB setting 905 presented in FIG. 9, the Web browser cooperation unit 812 applies, to the Web browser 705, SSB settings corresponding to cookie, address_bar, cache, and warn_not_exist_rootcert. cookie=on represents enabling a Cookie function. address_bar=off represents hiding an address bar for inputting a URL from the UI of the Web browser. cache=off represents disuse of a cache. warn_not_exist_rootcert=on represents enabling a warning display if a root certification does not exist at the time of encrypted communication. The SSB setting 905 of FIG. 9 is an example, and designable SSB settings are not limited to these.

Then, the Web browser cooperation unit 812 sets, in the Web browser 705, the URL assembled in step S1408 as a connection destination (step S1411). The Web browser cooperation unit 812 switches the display of the operation unit 111 from the menu application 704 to the GUI window of the Web browser 705 (step S1412). More specifically, the Web browser cooperation unit displays the Web browser by instructing the operation unit I/F 205 to display the display identifier 2112 of the Web browser.

Then, the control judgment unit 817 sets a monitoring flag for monitoring the Web browser held inside ON (step S1413). This makes it possible to judge that the MFP application APP712 is displaying the Web browser and to judge whether to perform state control if the state of the Web browser changes.

Next, the URL is stored in the HDD 204 as the history information of the Web browser. Then, the Web browser 705 displayed on the operation unit 111 accesses the URL set in step S1411 in order to call the top page of the Web application (step S1414).

By performing the above-described processing, the Web connection MFP application corresponding to the GUI button instructed by the menu application 704 can call the top page of the Web application.

Request Reception Processing by Web Application

Figure 15:
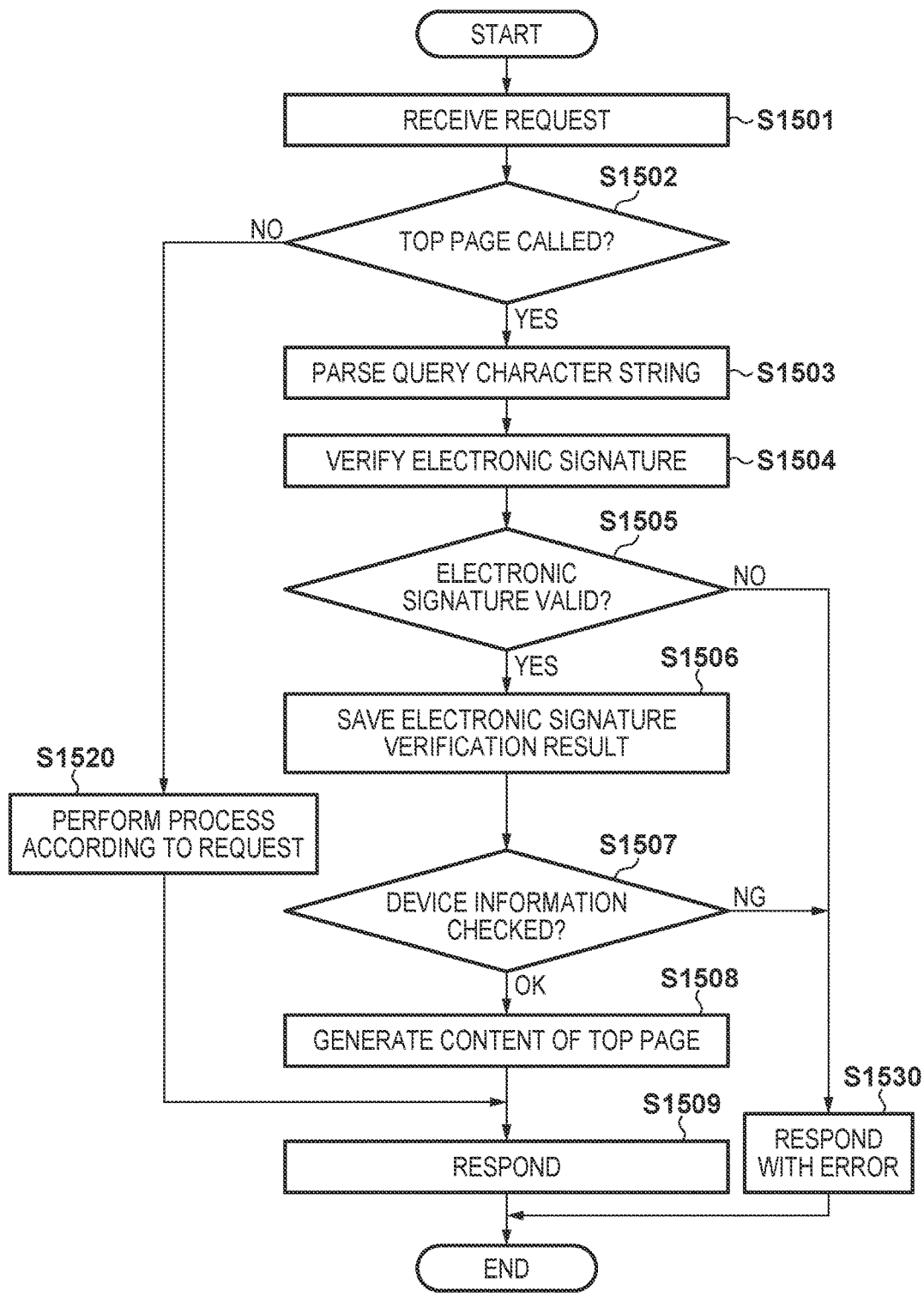
FIG. 15 is a flowchart showing an example of a process in the Web application server according to the embodiment.

FIG. 15 is a flowchart for explaining processing performed when the Web application server 130 receives a request by the HTTP from the MFP 110. Each step of the flowchart in FIG. 15 is performed by causing the CPU 301 to read out a program stored in the HDD 304 of the Web application server 130 to the RAM 303, and analyze and execute it. The flowchart of FIG. 15 describes the processes from steps S1303 to S1305 and from steps S1308 to S1310 of FIG. 13 in detail. Step S1303 of FIG. 13 corresponds to steps S1501 and S1502 in FIG. 15. Step S1304 of FIG. 13 corresponds to steps from S1503 to S1508 in FIG. 15. Step S1305 of FIG. 13 corresponds to step S1509 in FIG. 15. Step S1308 of FIG. 13 corresponds to steps S1501 and S1502 in FIG. 15. Step S1309 of FIG. 13 corresponds to step S1520 in FIG. 15. Step S1310 of FIG. 13 corresponds to step S1509 in FIG. 15.

First, the communication unit 1001 receives the request by the HTTP from the MFP 110 (step S1501). Then, the Web application processing unit 1002 discriminates whether the accepted request is the calling of the top page, and if the request is the calling of the top page, the process advances to step S1503; otherwise, the process advances to step S1520 (step S1502).

In step S1520, the Web application processing unit 1002 performs a process according to the request received in step S1501. For example, if the received request is a request to call a scan setting screen, an HTML which forms the scan setting screen is generated. Then, the communication unit 1001 responds to the MFP 110 with a result of the process in step S1520 and terminates the process (step S1509).

On the other hand, in step S1503, the Web application processing unit 1002 analyzes the query character string included in the request received in step S1501 and extracts each item. In this example, the following explanation will be given here assuming that the respective items of the electronic signature, the time stamp, and the device information are obtained.

Then, the signature verification unit 1003 verifies the electronic signature extracted in step S1503 (step S1504). More specifically, the signature verification unit 1003 uses the signature character string as the message and the electronic signature key 1004 as the private key to calculate the message digest with the hash function and regards the value as a valid signature if it matches the electronic signature extracted in step S1503. The signature character string is obtained by coupling, as a character string, the URL of the request received in step S1501, the time stamp extracted in step S1503, and the device information. That is, the Web application server 130 performs the same processing as the processing performed by the MFP 110 in order to create the electronic signature in step S1407 of FIG. 14, confirming the validity of the electronic signature based on whether their results match. If the electronic signature key 815 of the MFP 110 and the electronic signature key 1004 of the Web application server 130 are the same, the results match. If the results match, it is possible to regard the request as being from the MFP 110 in which the Web connection MFP application is installed.

If the electronic signature is invalid, the Web application processing unit 1002 responds to a request source with an error and terminates the process (step S1530). On the other hand, if the electronic signature is valid, the Web application processing unit 1002 saves the verification result of the electronic signature in linkage with a session (step S1506). It becomes possible, by saving the verification result of the electronic signature in linkage with the session, to confirm that communication is from the MFP 110 in which the Web connection MFP application is installed in the subsequent process for the request. Note that depending on a Web application, the request source may be checked by using not the electronic signature but other information. In that case, steps from S1504 to S1506 are skipped, and substitute information is checked. For example, the IP address of the request source or the user agent of the Web browser may be checked, or the device information extracted in step S1503 may be checked.

In step S1507, the Web application processing unit 1002 checks the device information extracted in step S1503. If the Web application does not need the device information of the MFP 110, this step is not needed. If the Web application needs the device information of the MFP 110, the Web application processing unit 1002 checks the device information and if there is a problem, responds to the request source with the error and terminates the process (step S1530). On the other hand, if there is no problem in the device information, the Web application processing unit 1002 advances the process to next step S1508. A "confirmation of a user ID", "confirmation of valid optional function", "confirmation of a software version", or the like can be given as an example of the check of the device information.

In step S1508, the Web application processing unit 1002 generates the HTML content for displaying the top page. Finally, the communication unit 1001 responds to the MFP 110 with the HTML content generated in step S1508 and terminates the process (step S1509).

Monitoring of Web Browser Display

Figure 23:
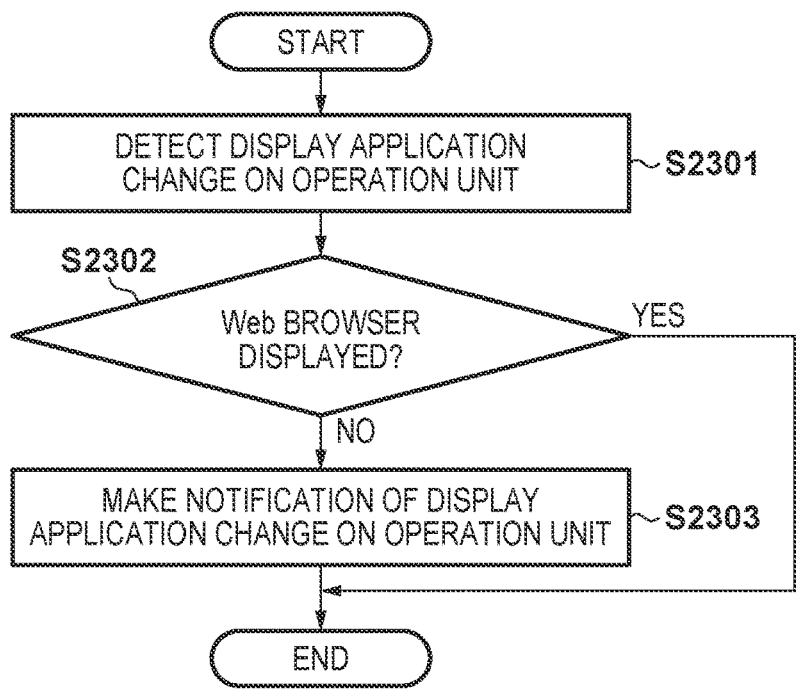
FIG. 23 is a flowchart showing an example of a process in the MFP according to the embodiment.

FIG. 23 is a flowchart for explaining a process of monitoring the display application change on the operation unit when the system application 706 receives, from the Web connection MFP application, the calling notification of the Web connection MFP application. This sequence is started by using, as a trigger, the calling notification of the Web connection MFP application transmitted by step S1402 if the menu application selects the Web connection MFP application, and the calling instruction is made.

Step S2301 is a step of detecting the display application change on the operation unit. The system application 706 receives a notification of the display application change on the operation unit from the Web connection MFP application. Then, the system application 706 judges, via the operation unit I/F 205, whether the Web browser is displayed (step S2302). An application to be monitored here has a display identifier given together with the calling notification of the Web connection MFP application. That is, the application is the Web browser here. In step S2302, if it is determined that the display identifier of the displayed application is that of the Web browser, the system application 706 judges that the Web browser is displayed and continues monitoring. Note that although a description is given as if the process were terminated in FIG. 23, monitoring and a determination in step S2302 are performed, for example, periodically or each time the display application is switched by using it as a trigger. If it is determined in step S2302 that the display identifier is different from that of the Web browser, the process proceeds to step S2303. There are two cases about the procedure of FIG. 14 when it is determined in step S2302 that the display application is not the Web browser. The first case is between the steps S1402 and S1412 before a menu screen is switched to a Web browser screen. The second case is a case in which the display of the Web browser screen displayed by the Web connection MFP application is switched to another screen by pressing of an operation key by the user, the exit of the Web application, or the like after the Web browser screen is displayed in step S1412.

Step S2303 is a step of notifying the display application change on the operation unit in which the Web browser monitoring unit of the Web connection MFP application is notified of the display application change, and this sequence ends thereafter. More specifically, the display application change is the display screen of the application as described in, for example, FIG. 21 from the Web browser. A Web connection MFP application of a notification destination can be, for example, under execution at the time of notification.

Note that in order to newly call the Web connection MFP application in a state in which the Web connection MFP application displays the Web browser on the operation unit 111, for example, in order to call APP712 in a state in which APP711 displays the Web browser, the menu application temporarily displays the menu screen. Therefore, if APP712 displays the Web browser, switching to the menu application is performed before that, and then APP 712 displays the Web browser. Thus, the control of the Web browser by this embodiment also functions in this case.

Monitoring of Web Browser State by Web Connection MFP Application

Figure 22:
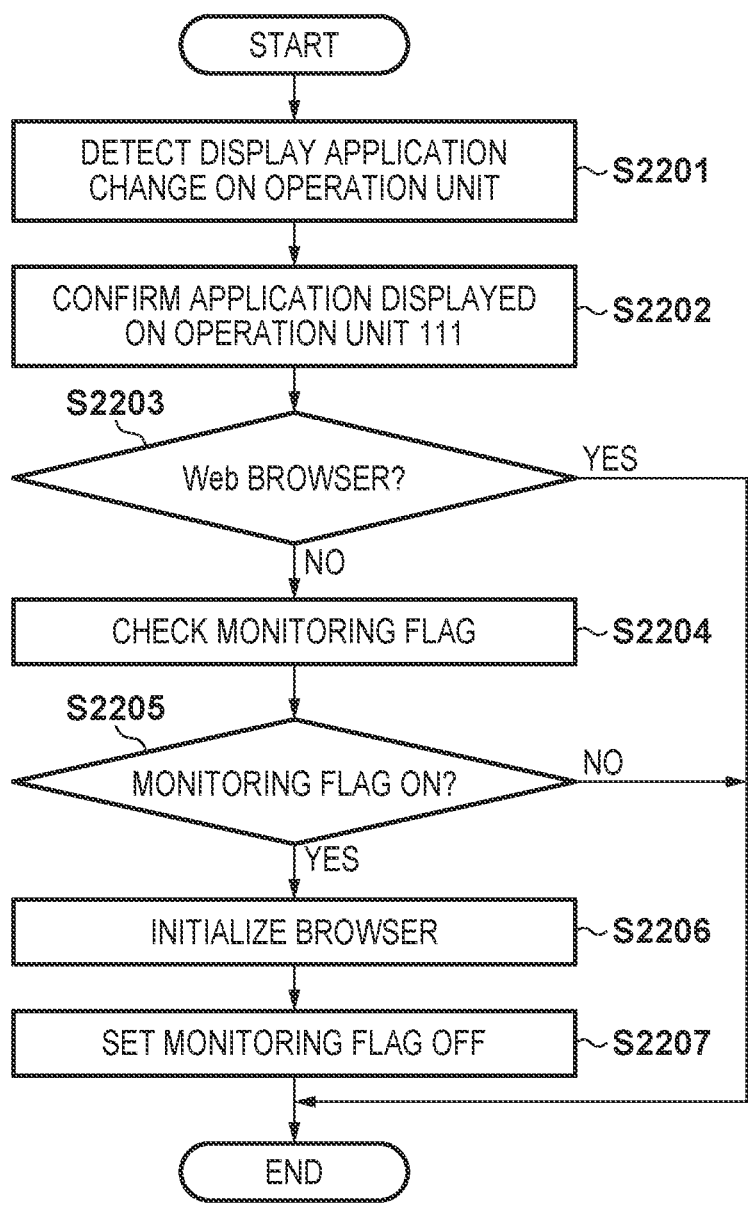
FIG. 22 is a flowchart showing an example of a process in the MFP according to the embodiment.

FIG. 22 is a flowchart for explaining a process until the Web connection MFP application monitors the state of the Web browser and executes control. As an example here, assume a state in which the MFP application APP712 described with reference to FIG. 13 is called and displays the Web browser. This procedure is performed by the Web browser monitoring unit 816 or control judgment unit 817 of the Web connection MFP application on software, or by the CPU 201 of the MFP 110 on hardware.

Step S2201 is a step of detecting a display application change on the operation unit. The Web browser monitoring unit 816 detects the display application change by receiving the notification of the display application change transmitted in step S2303 of FIG. 23. Note that the notification of the display application change includes the display identifier of the application, that is, the Web browser to be monitored, and thus the notified display identifier can be monitored. Note that the display application change can also be detected by causing the Web browser monitoring unit 816 to monitor the application displayed on the operation unit 111 via the operation unit I/F 205. In this case, if the application displayed on the operation unit 111 is changed, the operation unit I/F 205 notifies the Web browser monitoring unit 816 of the display application change. Note that the notification includes the display identifier, allowing the Web browser monitoring unit 816 to identify the displayed application. The notification also includes the identifier of a hidden application.

Step S2202 is a step of confirming the identifier of the display application. For example, if the Web browser is hidden, and the menu application is displayed, the identifier AAA111 of the Web browser as a hidden identifier and the identifier AAA112 of the menu application as a displayed identifier are notified. The Web browser monitoring unit 816 transmits information identified in step S2202 to the control judgment unit 817, and the control judgment unit 817 judges whether it is to be controlled.

Step S2203 is a step of judging whether the display by the application having the display identifier received in step S2201, that is, the Web browser is changed. The control judgment unit 817 judges whether the identifier transmitted from the Web browser monitoring unit 816 is that of the Web browser. If the identifier is not that of the Web browser, the process proceeds to step S2204. If the identifier is that of the Web browser, this sequence ends. Note that the determination results of steps S2302 and S2203 are different if the Web browser screen is displayed again by step S2203 after it is determined in step S2302 of FIG. 23 that the Web browser screen is not displayed. In that case, the Web browser is not initialized. For such a case, steps S2202 and S2203 of FIG. 22 may be skipped. In this case, a monitoring flag test in step S2204 is conducted certainly if there is a notification by step S2303.

Step S2204 is a step of checking the monitoring flag. Step S2205 is a step of judging whether the monitoring flag is ON. As described with reference to FIG. 23, there are two cases when it is determined in step S2302 that the Web browser screen is not displayed. The first case is between steps S1402 and S1412 before the menu screen is switched to the Web browser screen. The second case is the case in which the display of the Web browser screen displayed by the Web connection MFP application is switched to the other screen by pressing of the operation key by the user, the exit of the Web application, or the like after the Web browser screen is displayed in step S1412. The monitoring flag is not set in the first case and is set in the second case.

Therefore, the control judgment unit 817 judges whether or not the monitoring flag set in step S1413 is ON. If the monitoring flag is ON, the control judgment unit 817 judges that the Web browser displayed before the display is switched to a current display is displayed by the MFP application APP712 in step S1412 and judges that it is to be controlled, and the process proceeds to step S2206. If the monitoring flag is OFF, the control judgment unit 817 judges that the Web browser is not displayed by the MFP application APP712 even if it is displayed before the display is switched to the current display and judges that it is not to be controlled. Thereafter, this sequence ends. It should be noted here that the monitoring flag is information held locally for each Web connection MFP application.

Step S2206 is a step of initializing the browser in which the application control unit 818 performs initialization processing of the Web browser via the Web browser cooperation unit 812. More specifically, information such as the cancellation of the SSB setting, Cookie, the history, or the like is reset. Then, after the initialization processing is performed, the monitoring flag managed by the control judgment unit 817 is set OFF (step S2207). Thereafter, this sequence ends. Consequently, even if the Web connection MFP application sets the Web browser for a corresponding Web application, the setting is initialized after the Web application finishes displaying the Web browser. This allows the user, when using the Web browser next, to use it in a state in which a browser setting by the Web connection MFP application of the previous user is canceled.

Uninstallation Processing of MFP Application

Figure 24:
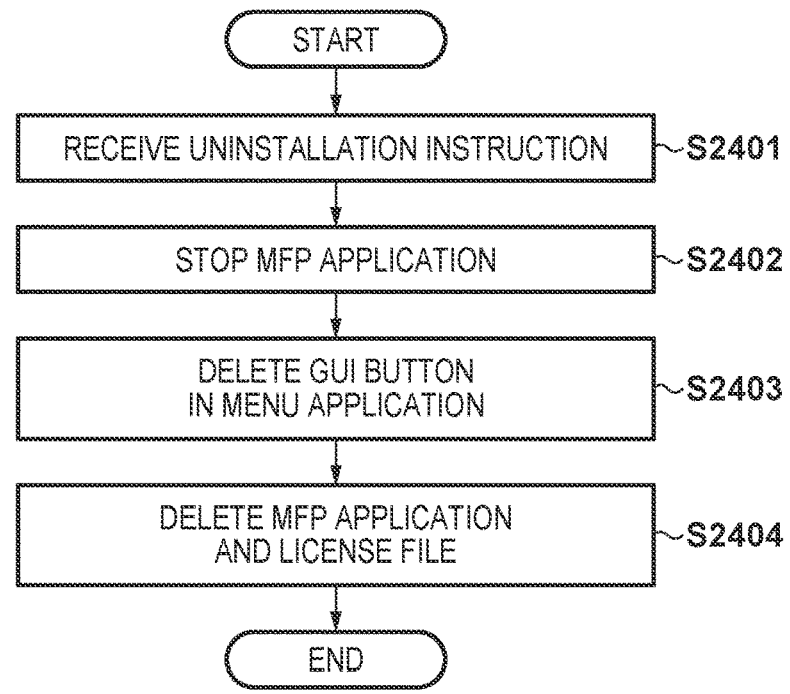
FIG. 24 is a flowchart showing an example of a process in the MFP according to the embodiment.

FIG. 24 is a flowchart for explaining uninstallation processing of an MFP application performed by the MFP 110. Each step of the flowchart in FIG. 24 is performed by causing the CPU 201 to read out a program stored in the HDD 204 of the MFP 110 to the RAM 203, and analyze and execute it.

The installation processing unit 701 receives an uninstallation instruction from the PC 140 operated by the user of the MFP 110 (step S2401). In step S2402, the installation processing unit 701 performs a stop process of the MFP application. More specifically, the installation processing unit 701 performs a stop instruction on each module of the MFP application to be uninstalled, and the process proceeds to step S2403 at the completion of the stop process on all the modules.

In step S2403, registration of the GUI buttons of the MFP application in the menu application is canceled. Then, the MFP application and license file stored in the HDD are deleted.

Figure 25:
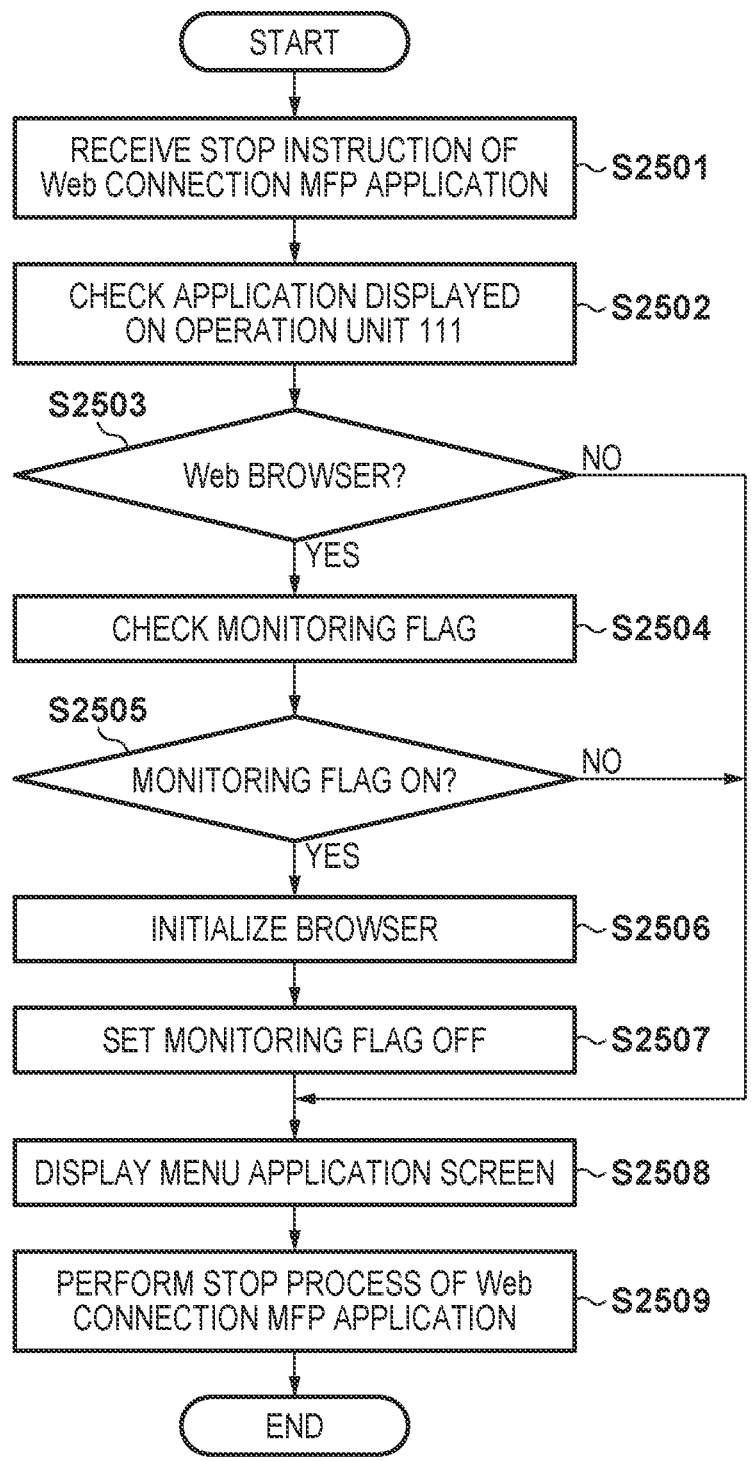
FIG. 25 is a flowchart showing an example of a process in the MFP according to the embodiment.

FIG. 25 is a flowchart for explaining a concrete sequence in a case in which the stop process of the Web connection MFP application is instructed in the stop process of the MFP application in step S2402. A description will be given here by taking, as an example, a case in which the installation processing unit 701 instructs the stop process on the MFP application APP712 described with reference to FIG. 13.

Step S2501 is a step of receiving the stop instruction of the Web connection MFP application and corresponds to step S2402.

Step S2502 is a step of checking an application displayed on the operation unit 111. The Web browser monitoring unit 816 confirms, via the operation unit I/F 205, the display identifier of the application displayed on the operation unit 111 and transmits the confirmed display identifier to the control judgment unit 817.

Step S2503 is a step of judging whether the application displayed on the operation unit 111 is the Web browser. If the control judgment unit 817 judges that the display identifier received in step S2502 is that of the Web browser, the process proceeds to step S2504. If the control judgment unit 817 judges that the display identifier is not that of the Web browser, the process proceeds to step S2508.

Step S2504 is a step of checking a monitoring flag.

Step S2505 is a step of judging whether the monitoring flag is ON. The control judgment unit 817 judges whether the monitoring flag set in step S1413 is ON. If the monitoring flag is ON, the control judgment unit 817 judges that the displayed Web browser is displayed by the MFP application APP712 and is to be controlled, and the process proceeds to step S2506. If the monitoring flag is OFF, the control judgment unit 817 judges that the Web browser is not displayed by the MFP application APP712 and is not to be controlled, and the process proceeds to step S2508.

Step S2506 is a step of initializing the browser in which the application control unit 818 performs initialization processing of the Web browser via the Web browser cooperation unit 812. More specifically, information such as the cancellation of the SSB setting, the history, or the like is reset. Then, after the initialization processing is performed, the monitoring flag managed by the control judgment unit 817 is set OFF in step S2507.

Step S2508 is a step of displaying the screen of the menu application in which an application control unit 8118 displays the menu application by instructing the operation unit I/F 205 to display the display identifier 2112 of the menu application.

Step S2509 is a step of performing the stop process of the Web connection MFP application in which the stop process of each module of the Web connection MFP application APP712 is performed. Thereafter, this sequence ends.

With the above-described procedure, it becomes possible to control the state of the Web browser of the common component for each Web application.

Effect of Invention According to Embodiment

Figure 26A:
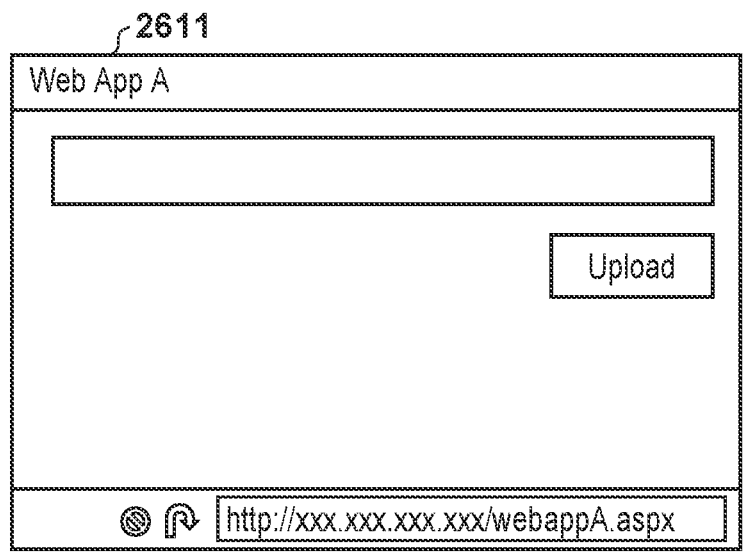
FIGS. 26A, 26B, 26C, and 26D are views showing display examples of a Web browser.
Figure 26B:
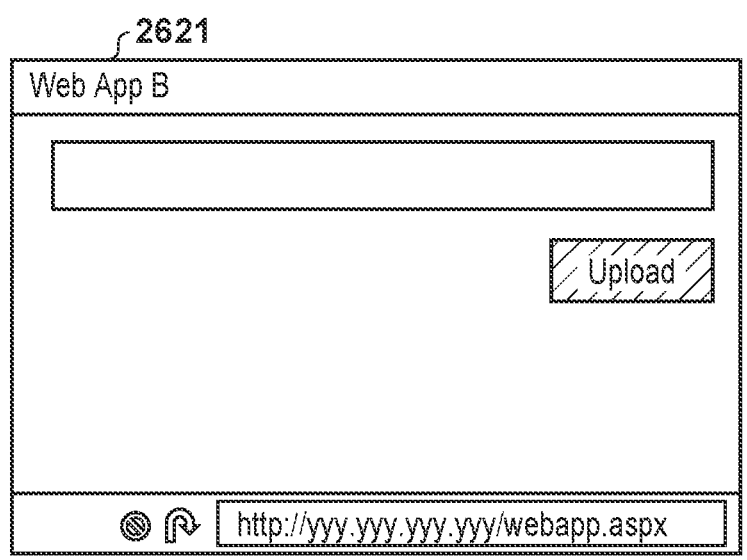

An effect by the present invention according to this embodiment will be described below concretely. FIGS. 26A and 26B show display examples of the Web browser displayed on the operation unit 111 of the MFP 110 according to this embodiment. A screen 2611 is an example of a screen when the Web browser is called from the Web connection MFP application APP711. A screen 2621 is an example of a screen displayed when the Web browser is called from the Web connection MFP application APP712. Let Web APP A be a Web application connected by the Web connection MFP application APP711. Let Web App B be a Web application connected by the Web connection MFP application APP712.

In the operation of the MFP 110, there is a case in which the different Web browser settings are to be applied and operated to use the respective Web applications such that when Web App A is used, file upload is permitted; otherwise, file upload is prohibited from the viewpoint of security.

There is a setting item regarding the restriction on file upload in the SSB setting of the Web browser, and this setting can be changed. The Web browser is the common component, and thus the applied SSB setting is only one. If the setting regarding the restriction on file upload sets a state in which the file upload is restricted as the initial state of the Web browser, a problem that the file cannot be uploaded in using Web App A arises. To cope with this, the SSB setting is applied when the respective Web applications start to be used, that is, when the Web connection MFP applications are called in the SSB setting processing shown in steps S1409 and S1410 of FIG. 14, making it possible to operate so as to enable file upload when Web App A is used.

On the other hand, the SSB setting is not applied in steps S1409 and S1410 of FIG. 14 when it is assumed that Web App B does not have its own SSB setting and operates with the initial value of the Web browser. Consequently, if Web App B is used via the Web connection MFP application APP712 after Web App A is used, a state is brought about in which file upload remains enabled. From the viewpoint of security, a problem arises in a case in which file upload is to be prohibited when Web App B is used.

In this embodiment, as shown in FIGS. 22 and 23, the SSB setting is also set to the initial value by causing the MFP connection MFP application (or the system application 706) to monitor a change in display state of the Web browser called by itself, detect that the Web browser is hidden, and reset the state of the Web browser. Accordingly, the SSB setting applied by the Web connection MFP application APP711 is also set to the initial value if the Web connection MFP application APP711 displays the Web browser, and the Web browser is hidden. This makes it possible to prevent the Web browser from being used in a state in which file upload is restricted and the aforementioned problem from arising even if Web App B is used via the Web connection APP711 after Web App A is used as described above.

Figure 26C:
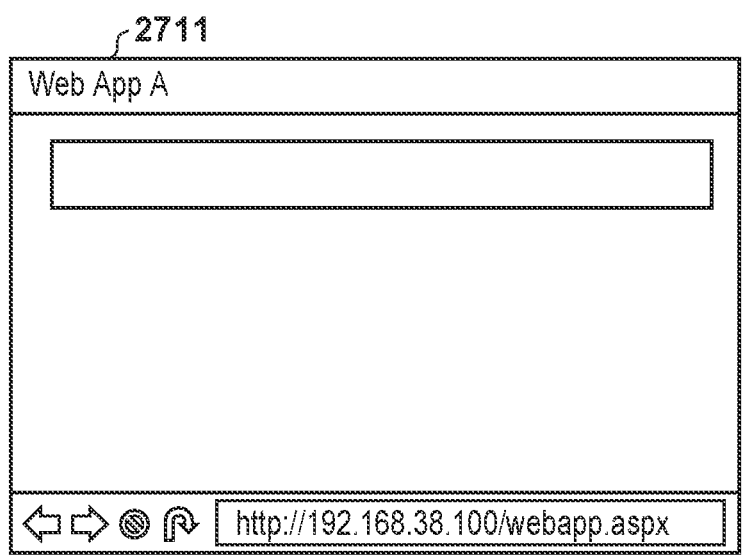
Figure 26D:
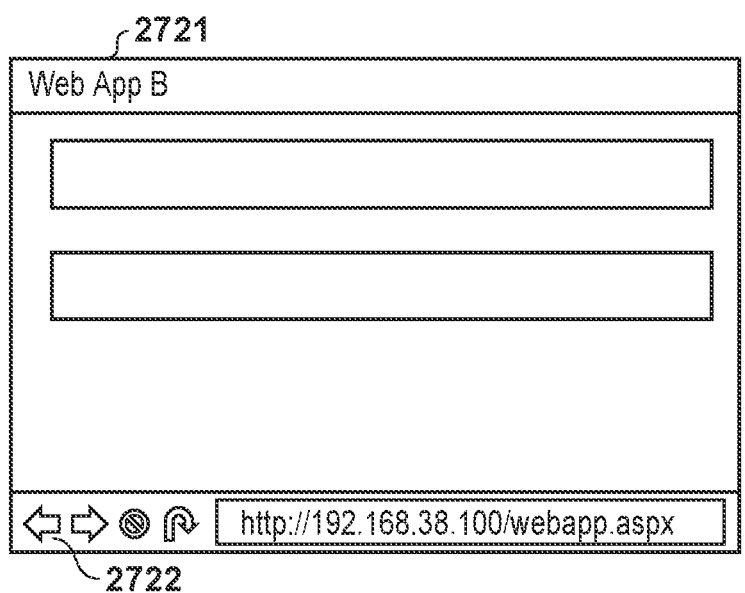

As another case, FIGS. 26C and 26D shows display examples of the Web browser displayed on the operation unit 111 of the MFP 110 according to this embodiment. A screen 2711 is an example of a screen when the Web browser is called from the Web connection MFP application APP711. A screen 2721 is an example of a screen displayed when the Web browser is called from the Web connection MFP application APP712. Let Web APP A be the Web application connected by the Web connection MFP application APP711. Let Web App B be the Web application connected by the Web connection MFP application APP712. Note that the Web applications and the Web connection MFP applications are different in contents from those described with reference to FIGS. 26A and 26B.

The Web browser is the common component, and history information regarding access to an URL is not managed for each Web application either. Thus, when Web App B is used after Web App A is used, a state is brought about in which information on Web App A remains as a history if the Web browser is called via the Web connection MFP application APP712 in order to use Web App B. In this case, it becomes possible to access the URL of Web App A while applying, for example, the SSB setting of Web App B by a return button 2722 of the browser, and Web App A is used in an unintended SSB setting if Web App A needs a special SSB setting. This may cause a problem.

In this embodiment, as shown in FIGS. 22 and 23, the history information of the Web browser is also initialized by causing the MFP connection MFP application (or the system application 706) to monitor the change in display state of the Web browser called by itself, detect that the Web browser is hidden, and reset the state of the Web browser. This makes it possible to prevent access to Web App A by using the history information in a state in which the Web browser is called via the Web connection MFP application APP712 in order to use Web App B. It is therefore possible to prevent the aforementioned problem from arising.

As described above, different types of settings and state management can be performed in accordance with the respective Web applications, making it possible to provide an optimum user interface such as a standard application.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-164066, filed Aug. 24, 2016, which is hereby incorporated by reference herein in its entirety.

What is claimed is:

1. An information processing apparatus comprising:
at least one processor or circuit to perform the operations of:
a web browser configured to display, on a display, a screen obtained from an access destination;

an access unit associated with an access destination, and configured to access the access destination by using the web browser; and a saving unit configured to save a setting of the web browser according to the access destination, wherein the access unit executes the web browser with the setting saved in the saving unit in accordance with the associated access destination, and wherein in a case where the web browser used by the access unit displays the screen displayed on the display when the access unit finishes accessing the access destination, the saving unit cancels the setting of the web browser.

2. The information processing apparatus according to claim 1, wherein the at least one processor or circuit further performs the operations of:

a monitoring unit configured to start monitoring whether the screen being displayed on the display ceases to be a screen of the web browser when the access unit accesses the access destination, and a cancellation unit configured to cancel the setting of the web browser by the access unit if the monitoring unit detects that the screen being displayed on the display ceases to be a screen of the web browser.

3. The information processing apparatus according to claim 2, wherein the access unit stores a calling of the web browser for the access destination, and the cancellation unit cancels the setting of the web browser if the web browser is called for the access destination when it is detected that the screen being displayed on the display ceases to be a screen of the web browser.

4. The information processing apparatus according to claim 3, wherein the access unit includes an application program for the access destination, accesses an access destination decided in accordance with the application program to be executed, and calls the web browser for the application program.

5. The information processing apparatus according to claim 1, wherein the setting includes at least one of a history of access by the web browser and a restriction on upload.

6. The information processing apparatus according to claim 1, wherein after the setting of the web browser is canceled, the display displays a menu for designating a process to be performed, and the access unit finishes accessing the access destination.

7. The information processing apparatus according to claim 6, wherein after the access unit finishes accessing the access destination, an application program for accessing the access destination and a license file of the application program are deleted.

8. A method of controlling an information processing apparatus that includes a web browser configured to display a screen obtained from an access destination and a saving unit configured to save a setting of the web browser according to the access destination, the method comprising:

accessing an access destination by an access unit associated with the specific access destination by using the web browser, wherein in the accessing, the web browser is executed with a setting saved in the saving unit in accordance with the associated access destination, and wherein in a case where the web browser used by the access unit displays the screen displayed on a display when the access unit finishes accessing the access destination, the saving unit cancels the setting of the web browser.

9. The method according to claim 8, further comprising starting moni toring whether the screen being displayed on the display ceases to be a screen of the web browser when accessing the access destination in the accessing, and canceling the setting of the web browser in the accessing if it is detected that the screen being displayed on the display ceases to be a screen of the web browser.

10. A non-transitory computer-readable medium storing therein a program for causing a computer with a display to function as:

a web browser configured to display, on the display, a screen obtained from an access destination;

an access unit associated with access destination, and configured to call the web browser and access the access destination; and a saving unit configured to save a setting of the web browser according to the access destination, wherein the access unit executes the web browser with the setting saved in the saving unit in accordance with the associated access destination, and wherein in a case where the web browser used by the access unit displays the screen displayed on the display when the access unit finishes accessing the access destination, the saving unit cancels the setting of the web browser.

11. The medium according to claim 10, wherein the program further causes the computer to function as:

a monitoring unit configured to start monitoring whether the screen being displayed on the display ceases to be a screen of the web browser when the access unit accesses the access destination, and a cancellation unit configured to cancel the setting of the web browser by the access unit if the monitoring unit detects that the screen being displayed on the display ceases to be a screen of the web browser.

12. An image forming apparatus comprising:

a web browser; and an application, wherein the application is configured to operate the web browser so as to access a URL associated with the application and to display a window of the web browser associated with the application, and in a case that a screen of the window of the web browser is hidden, the application instructs to eliminate a history of the web browser.

13. The image forming apparatus according to claim 12, wherein if a license of the application is valid, the application calls the web browser so as to access the URL associated with the application and display the window of the web browser associated with the application.

14. The image forming apparatus according to claim 12, wherein the application is further configured to monitor a screen display state of the web browser.

* * * * *